Figure 1:
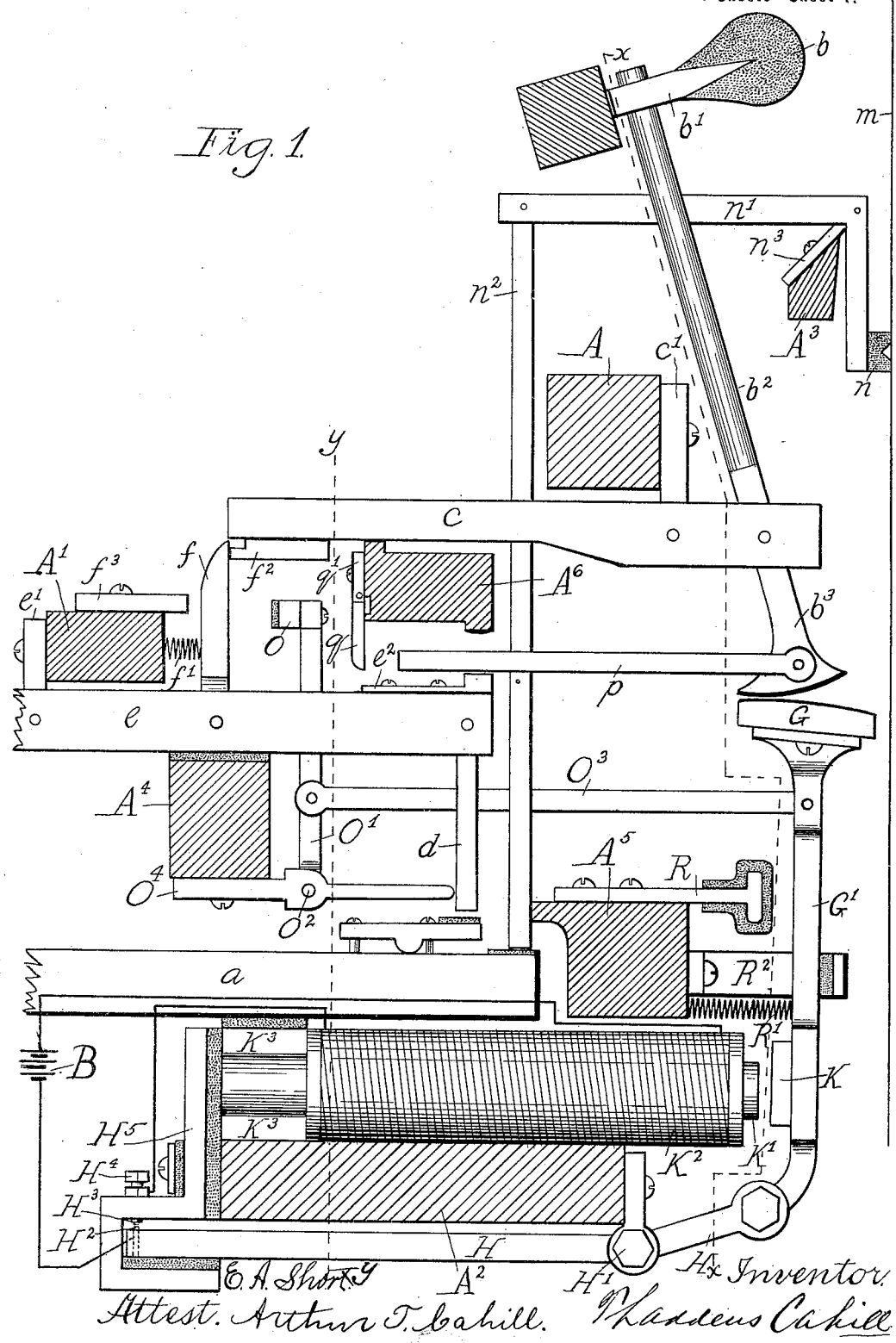

No. 657,477. Patented Sept. 4, 1900.
T. CAHILL.
PIANO ACTION OR OTHER KEYBOARD INSTRUMENT.
(Application filed Sept. 8, 1894.)
(No Model.) 6 Sheets—Sheet I.

Attest. E. A. Short. Arthur T. Cahill.
Inventor, Thaddeus Cahill.

THE NORRIS PETERS CO., PHOTO-LITHO., WASHINGTON, D. C.

No. 657,477. Patented Sept. 4, 1900.
T. CAHILL.
PIANO ACTION OR OTHER KEYBOARD INSTRUMENT.
(Application filed Sept. 8, 1894.)
(No Model.) 6 Sheets—Sheet 2.
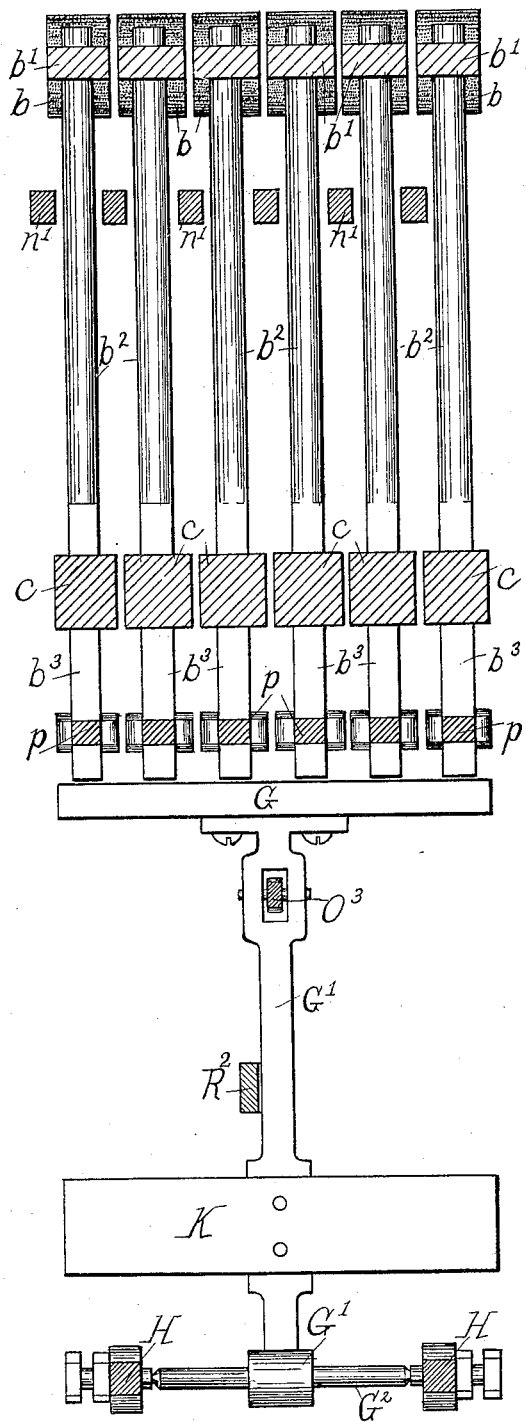
Fig. 1.A
Attest.
E. A. Short.
Arthur T. Cahill
Inventor.
Thaddeus Cahill

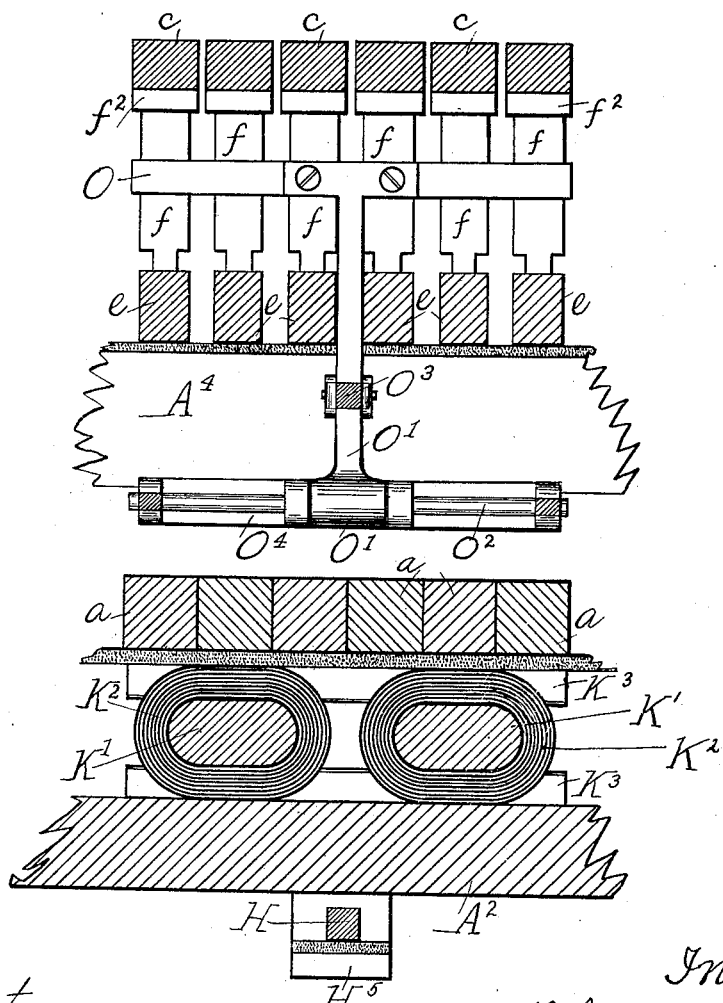

No. 657,477. Patented Sept. 4, 1900.
T. CAHILL.
PIANO ACTION OR OTHER KEYBOARD INSTRUMENT.
(Application filed Sept. 8, 1894.)
(No Model.) 6 Sheets—Sheet 4.

Attest
E. A. Short.
Arthur T. Cahill.

Inventor.
Thaddeus Cahill

No. 657,477. Patented Sept. 4, 1900.
T. CAHILL.
PIANO ACTION OR OTHER KEYBOARD INSTRUMENT.
(Application filed Sept. 8, 1894.)
(No Model.) 6 Sheets—Sheet 5.
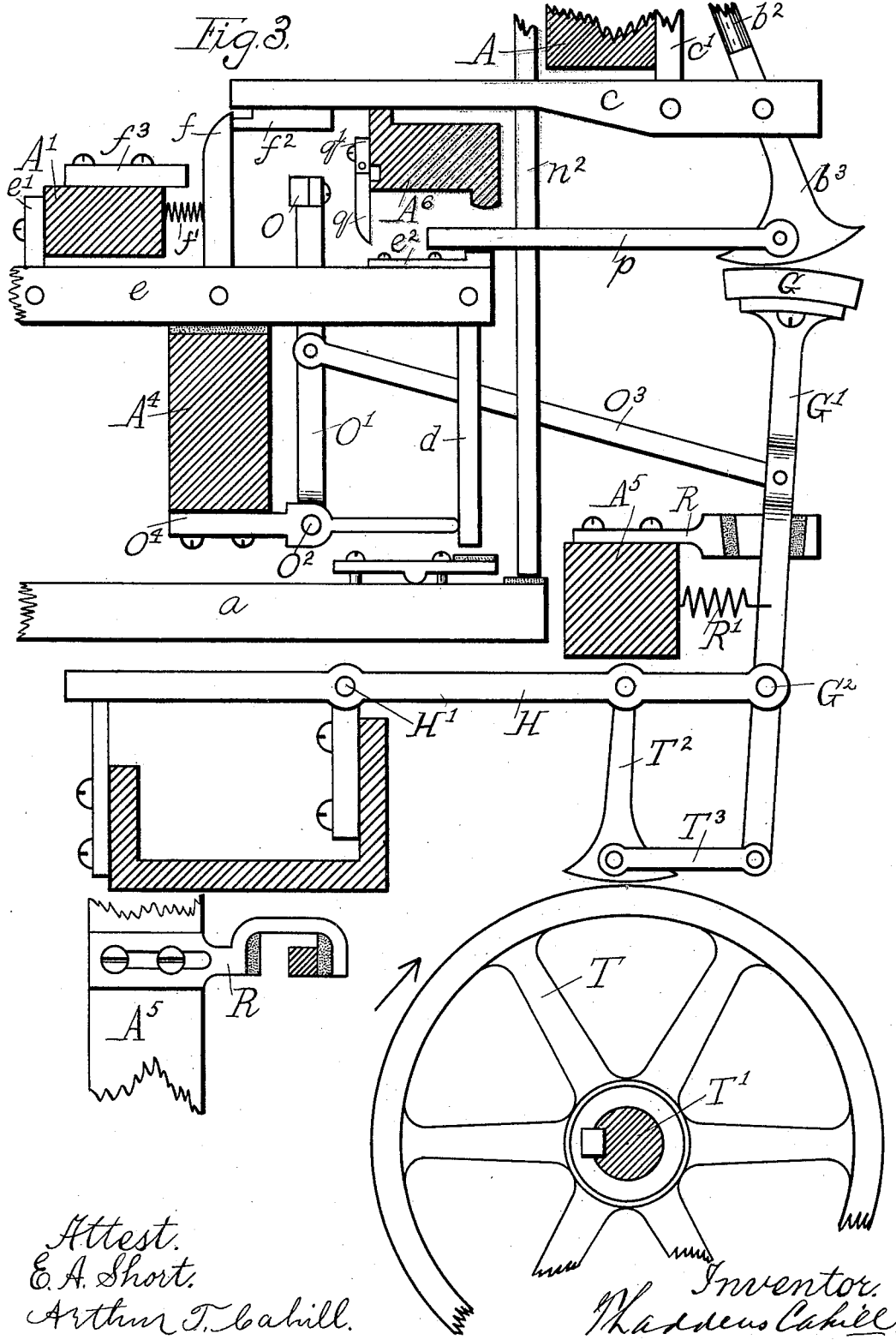

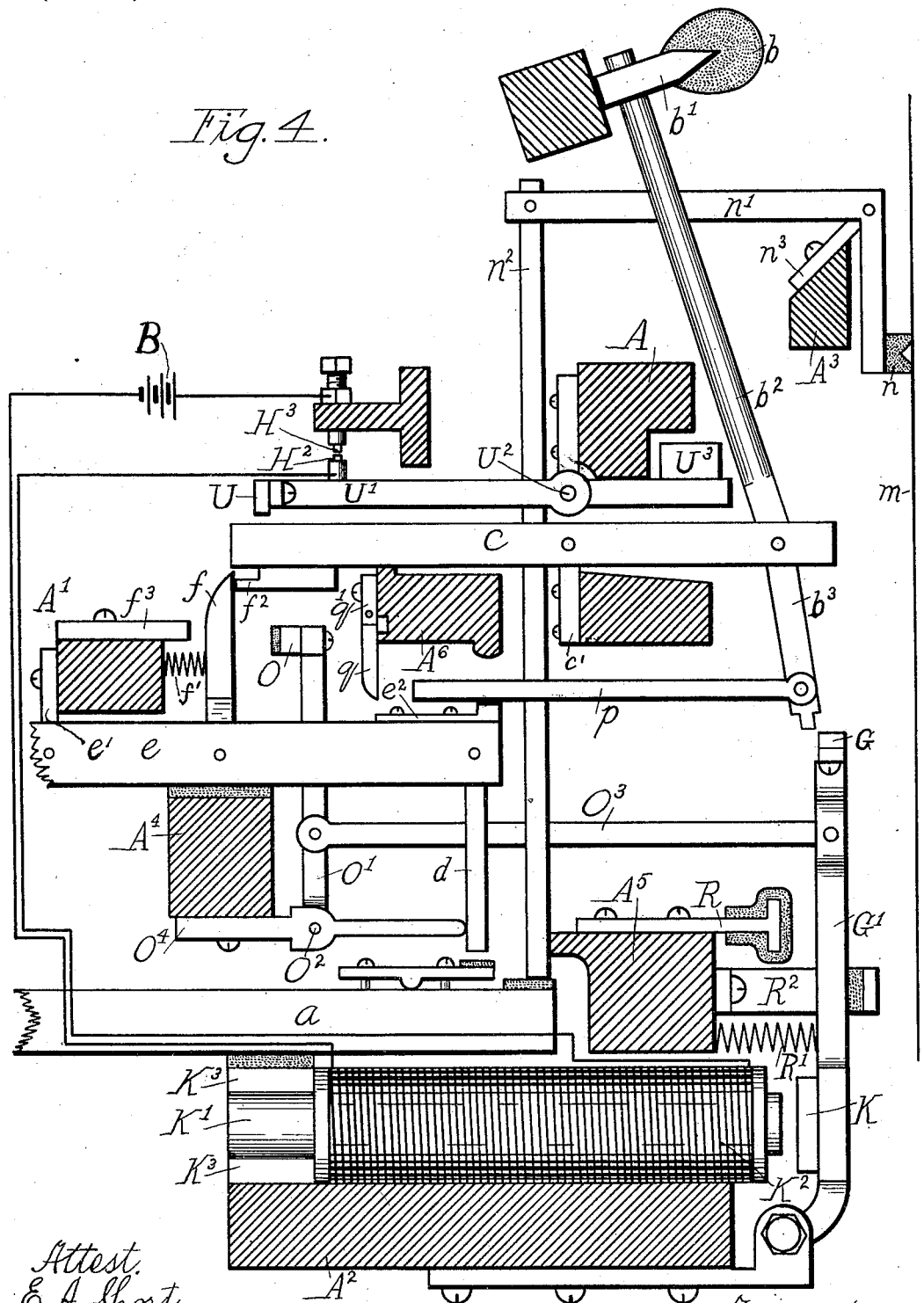

UNITED STATES PATENT OFFICE.

THADDEUS CAHILL, OF NEW YORK, N. Y., ASSIGNOR TO JAMES B. LAMBIE, E. HILTON JACKSON, GEORGE FREDERICK CAHILL, AND ARTHUR T. CAHILL, TRUSTEES.

PIANO-ACTION OR OTHER KEYBOARD INSTRUMENT.

SPECIFICATION forming part of Letters Patent No. 657,477, dated September 4, 1900.

Application filed September 8, 1894. Serial No. 522,435. (No model.)

*To all whom it may concern:*

Be it known that I, THADDEUS CAHILL, a citizen of the United States, and a resident of the city, county, and State of New York, but temporarily residing at Washington, in the District of Columbia, have invented certain new and useful Improvements in Keyboard Mechanisms, of which improvements the following is a specification.

The principal object of my invention is to make a simple and effective power action for a keyboard mechanism; and my invention consists in the parts, improvements, combinations, and subcombinations hereinafter set forth and distinctly claimed at the end hereof.

My invention may be carried out in a variety of different forms.

I shall first illustrate my invention as applied to a pianoforte and shall describe it without making any reference to any other instrument whatever, and then after the invention as embodied in a pianoforte-action has been made clear it will be obvious that certain important features of my invention may be applied to other keyboard mechanisms also, and I shall specifically set forth in the statement of claims at the end hereof the combinations and subcombinations which I claim as of my own invention and for which I desire protection.

Several forms of my invention as applied to a pianoforte are illustrated in the accompanying drawings. All the forms of pianoforte-action illustrated, however, (with a single exception,) while differing much in detail, are alike in this that each consists of a plurality of keys, hammers corresponding thereto, and a power device common to such keys and hammers, said power device being normally at rest and the parts being constructed and arranged in such a manner that each key when depressed connects its hammer with the power device and affects the power device in such a manner that the power device moves the hammer. I prefer ($a$) to employ an electrical power device and ($b$) to connect the power device with the hammers by means of a reciprocator normally at rest and ($c$) to make such connection between the hammers and the power device by means of a key-controlled friction, and ($d$) to make the connection between the key and the power device, whereby the power device is called into activity on the depressing of the key by means, in part, of the reciprocator itself, and ($e$) to connect the parts in such a manner that the reciprocator itself serves to cut off the power by which it is impelled, and ($f$) to use as the releasing device for the hammer a jack and a frame connected with the reciprocator for freeing said jack, and ($g$) to employ as the check for the hammer a key-controlled friction-check connected with the contact-piece, whereby the hammer is impelled, and, further, ($h$) to use, in connection with the key-controlled friction-check, a check-retarding device, whereby the application of the check to the hammer is delayed until the hammer strikes the string; but while each of these features of construction is considered advantageous and in different measures important, it is to be understood that no one of them is in itself indispensable to the carrying out of other important parts of my invention.

Figure 2:
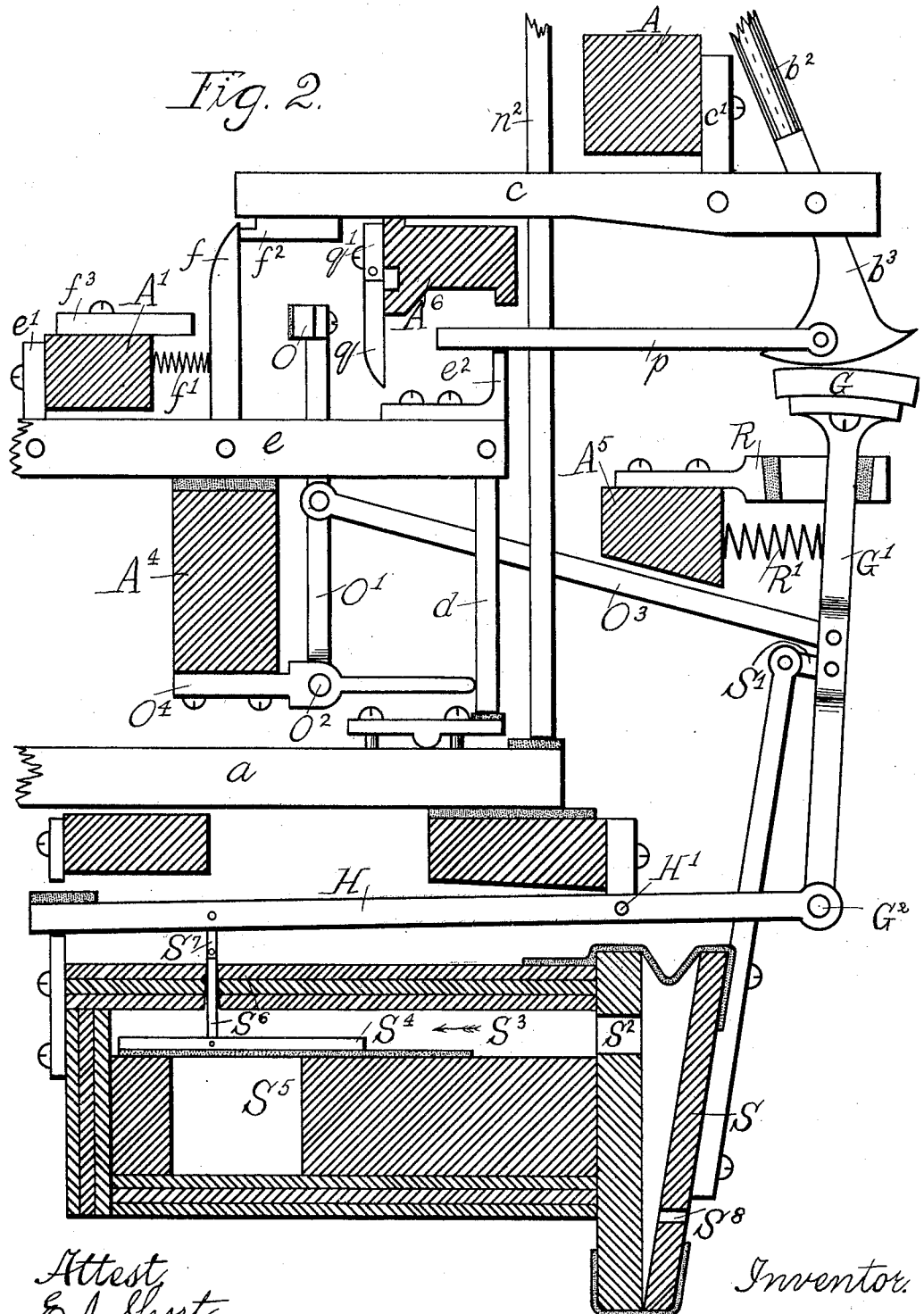

In the accompanying drawings, Figure 1 is is a sectional view, partly in elevation, through the action in a line parallel to the length of one of the keys, illustrating my action as applied to a pianoforte with an electromagnetic power device. Fig. 1$^A$ is a sectional elevation on the line $x\,x$, Fig. 1, the hammers and hammer-shanks being represented as standing vertical for greater clearness of illustration. Fig. 1$^B$ is a detail vertical section on the line $y\,y$, Fig. 1. Fig. 2 is a sectional elevation corresponding with Fig. 1, but illustrating my action with a pneumatic power device instead of an electromagnetic power device. Fig. 3 is a similar view representing my action with a friction-driver power device, and Fig. 4 represents a modified arrangement of the mechanism by which the power device is called into activity and the hammers connected with the power device on the depressing of the key.

Similar letters refer to similar parts in all the drawings, but it will be of assistance to the reader to note that in every case parts of the structure that serve for a plurality of keys are designated by capital letters, while the individual keys and all parts that serve for one key only are marked with small letters.

I shall first describe the device illustrated in Figs. 1, 1ᴬ, and 1ᴮ and after that will describe the other forms illustrated in the drawings.

$a$ is the key.

$b$ is the hammer; $b'$, the hammer-head; $b^2$, the hammer-shank, and $b^3$ is the hammer-butt, formed integral with the hammer-shank and arranged to serve as a contact-piece, as hereinafter explained.

The hammer-butt $b^3$ is pivotally mounted in the lever $c$, which lever is itself fulcrumed by means of a hanger $c'$, screwed fast to the action-rail A. The key $a$ is connected with the hammer-butt contact-piece $b^3$ by means of a reach-up $d$, lever $e$, jack $f$, and lever $c$. The lever $e$ is fulcrumed by means of a hanger $e'$, screwed fast to the action-rail $A'$. The jack $f$ is pivoted to the lever $e$ and is normally pressed by a light expansive spring $f'$ against the stop-piece $f^2$, attached to the lever $c$. A suitable stop $f^3$, screwed fast to the rail $A'$, serves to limit the movement of the jack $f$.

Immediately underneath the contact-piece $b^3$ is the reciprocator, which, as figured in the drawings, consists of a top piece G and a radius-piece $G'$, fulcrumed on a shaft or rod $G^2$; but I attach no special importance to the exact form of reciprocator shown, and any other form, shape, or pattern of reciprocator whatever that is suitable for the purpose may be used instead. The rod $G^2$ is pivoted to one end of the lever H, which lever is made U-shaped at the end proximate to the rod $G^2$. Said lever is itself fulcrumed at $H'$ and carries at its longer end an electrical contact-point $H^2$, of platinum or other suitable material, which is arranged to play in and out of contact with a similar contact-piece $H^3$, the latter contact-piece being set in an adjustment-screw $H^4$, which screw is set in the casting $H^5$, which casting is attached by one or more strong screws to the rail $A^2$, pieces of felt or other suitable insulating sound-deadening material being interposed between the casting $H^5$ and the rail $A^2$ and between the casting $H^5$ and the screw by which said casting is attached to the rail $A^2$.

An armature K is attached to the reciprocator. This armature is arranged to play in front of an electromagnet consisting of soft Norway or Swede's charcoal iron cores $K'$ $K'$, coils of insulated copper wire $K^2$ $K^2$, wound upon said cores, soft-iron yokes $K^3$ $K^3$, and thin pieces of brass, German silver, or other suitable material having no magnetic remanence interposed between the yokes and the cores to break the continuity of the magnetic circuit through iron and so facilitate demagnetization. Screws (not shown in the drawings) fasten the yoke-pieces $K^3$ $K^3$ and cores $K'$ $K'$ firmly to each other and to the rail $A^2$. The coils $K^2$ $K^2$ are in circuit with a suitable voltaic battery B or other suitable source of electricity, the platinum points $H^2$ and $H^3$ being the terminals of the circuit.

$m$ is the string.

$n$ is the damper; $n'$, the damper-lever, and $n^2$ is the reach-up by which the damper-lever is connected with the key, and $n^3$ the hanger, by which the damper-lever is fulcrumed and attached to the rail $A^3$.

A felted knock-out bar O is screwed fast to the free end of a lever $O'$, which lever is fulcrumed upon a center $O^2$ and connected by a link $O^3$ with the part $G'$ of the reciprocator. The shaft or center $O'$ is mounted in the casting $O^4$, which is itself attached fast to the rail $A^4$. A push-piece $p$ is pin-jointed to the hammer-butt $b^3$ and arranged to act upon the releasing-stop $q$, which is pivoted in a hanger $q'$, which hanger is screwed fast to the rail $A^6$. The push-piece $p$ serves both to act upon the releasing-stop $q$ about the instant the hammer strikes the string, knocking the releasing-stop out from over the part $e^2$, attached to the key $e$, thus allowing the pressure of the key to be transferred from the releasing-stop $q$ to the push-piece $p$, and after the pressure of the key is thus transferred to the push-piece $p$, whereby said push-piece is pressed up against the lower surface of the rail $A^6$, said push-piece $p$ serves, in connection with the key which presses it and the rail $A^6$, against which it is pressed, to form a frictional check, whereby the retreat of the hammer from the string is resisted and the hammer prevented from rebounding upon the string after it has delivered its blow thereon.

R and $R^2$ are stops that serve to limit the play of the reciprocator and to prevent the armature K from approaching too close to the cores $K'$ $K'$. Said stops are attached fast by screws to the rail $A^5$. An expansive spring $R'$ serves to return the reciprocator to its normal position.

The operation is as follows: When the key is pressed upon by the performer in front of the fulcrum, it rises back of the fulcrum and through the reach-up $n^2$ and damper-lever $n'$ withdraws the damper $n$ from the string $m$. At the same time the key, through the reach-up $d$, lever $e$, jack $f$, and lever $c$, presses the hammer-butt contact-piece $b^3$ down upon the part G of the reciprocator, so establishing a frictional connection between the parts $b^3$ and G and also pressing down the parts G and $G'$ a very short distance, indeed, raising the longer end of the lever H and bringing the electrical contacts $H^2$ and $H^3$ in contact with each other, thus closing the electrical circuit through the coils $K^2$ $K^2$. The cores $K'$ $K'$ instantly become intensely magnetic and attract the armature K toward them, so moving the reciprocator and throwing the hammer toward the string more or less forcibly, according to the pressure upon the key and the resulting pressure with which the parts $b^3$ and G are pressed together. Just before the armature K reaches its position of greatest proximity to the cores K' K' the felted bar O strikes the jack $f$ and knocks it out from its normal position under the end of the lever $c$. Thus the frictional connection between the contact-piece $b^3$ and the "reciprocator" or "reciprocating" friction-driver (as it may properly be termed) G is instantly broken, the lever $c$ returns to its normal position, and the lever H (the longer end of which is arranged to counterbalance the weight of the parts G, G', and K) returns to its normal position, carrying the electrical contact-piece $H^2$ away from the other electrical contact-piece $H^3$ and breaking the electrical circuit in which are the coils $K^2$ $K^2$. The cores K' K' instantly lose their magnetism and the spring R' returns the parts G' and G and the armature K to their normal positions. When the connection between the key $a$ and the lever $c$ and contact-piece $b^3$ is broken by the part O acting upon the jack $f$, the key moves up a short distance until the part $e^2$, carried by the lever $e$, comes in contact with and is arrested by the releasing-stop $q$. The key $a$ and the lever $e$ remain in this position until at or about the instant the hammer strikes the string the part $p$ strikes the releasing-stop $q$ and moves it away from the part $e^2$. The key now again moves up a very short distance and presses the part $p$, connected with the hammer, against the lower surface of the rail $A^6$, so opposing a frictional resistance to the retreat of the hammer from the string more or less powerful, according to the pressure upon the key and the force of the hammer-blow. The hammer at once rebounds from the string and reaches or nearly reaches its normal position, but is prevented by the checking-pressure exerted by the key upon the hammer through the push-piece $p$ from leaving that position or rebounding upon the string. If the pressure upon the key is light, the resulting frictional connection between the contact-piece $b^3$ and the reciprocator will be weak, the traction or pull exerted by the part G upon the part $b^3$ will be weak, the part G will move much more rapidly than the contact-piece $b^3$, and before the hammer has gone far on its journey to the string the reciprocator, acting through the parts $O^3$, O', and O upon the jack $f$, will have broken the pressure connection between the key and the contact-piece $b^3$ and the resulting frictional connection between said contact-piece and the reciprocator G, leaving the hammer free to continue its journey toward the string and the reciprocator free to return to its normal position. If, on the other hand, the pressure on the key is very firm, the resulting frictional connection between the contact-piece and the reciprocator will be correspondingly strong, the traction exerted by the reciprocator upon the part $b^3$ will also be strong in proportion, the reciprocator will move the contact-piece $b^3$ with little or no slip, and the hammer will be thrown upon the string with great force (relatively speaking) at or about the instant the reciprocator breaks the pressure connection between itself and the contact-piece $b^3$, and between these two extremes of very light and very firm touch the point of travel of the hammer on its journey toward the string at which the connection between the contact-piece $b^3$ and the motor-operated reciprocator G (or, in other words, between the hammer and the power device) is broken will vary with the pressure upon the key. The stronger the pressure upon the key the stronger the frictional connection between the hammer and the power device, the less the slip of the contact-piece, and the greater the movement of the hammer toward the string before the power connection is broken.

To secure the best effects from the action, the following points may well be observed: The hammer does not require as much play as is given to hammers in the actions now generally in use, and the action will be more sympathetic and delicate and more nearly instantaneous in its responsiveness when the play of the hammer is relatively small than when it is great. There should be but little lost motion between the jack $f$ and the lever $c$. The contact-piece $b^3$ should lie in a position of very close proximity to the reciprocator, so that there will be as little lost motion as possible at that point. The play of the lever H should be very small indeed, particularly at the point at which said lever is connected with the reciprocator. The spring R' should oppose but little resistance to the inward movement of the armature K when the armature is remote from the cores and in a weak field; but the strength of the spring should increase rapidly as the armature approaches the cores and the strength of the field increases. Many other points of detail will occur to a good mechanic skilled in the art and the electromagnets must be made quick-acting and of sufficient power.

Instead of using the form of electromagnet illustrated in the drawings any other suitable form of magnet whatever may be substituted for it. I have used other forms of magnet. (See, for example, the form of stopped coil and plunger electromagnet illustrated in specification and drawings of Letters Patent of the United States to me, Nos. 600,119 and 600,120.) Instead of using the circuit-closing mechanism shown in the drawings any other suitable form of circuit-controlling mechanism whatever may be used instead.

While I prefer to employ an electromagnet as the motor device in situations in which electric current can be readily obtained, yet it is not indispensable, I wish it to be understood, to the carrying out of numerous important features of my invention that an electromagnet be used as the motor.

In the present state of the art it goes without saying that instead of employing two solid electrical contacts like $H^2$ and $H^3$ a solid contact-piece may be made to play in and out of metallic mercury contained in a cup or trough. Each arrangement has its advantages and disadvantages, and both are well known. Carbon contact-pieces might perhaps be used instead of the points $H^2$ and $H^3$.

A pneumatic power device may be used to impel the reciprocator, as before suggested. An arrangement of a pneumatic power device is illustrated in Fig. 2, in which S is a small power-bellows or pneumatic connected by a link S' with the part G'. A port $S^2$ connects the pneumatic with the corresponding valve-chamber $S^3$, (there being a separate valve-chamber for each separate pneumatic.) In the valve-chamber $S^3$ is a valve $S^4$, opening upon the vacuum or exhaust trunk $S^5$. The valve $S^4$ is connected by a tracker $S^6$ and link $S^7$ with the lever H. The other parts of the action are as already described. When the key is pressed upon, it acts through the parts before described upon the reciprocator, pressing the parts G and G' downward and raising the longer end of the lever H, which in turn opens the valve $S^4$. The air contained in the pneumatic S at once rushes into the vacuum or exhaust trunk $S^5$ and the pneumatic closes under the influence of the external atmospheric pressure, so moving the reciprocator and other parts in the manner already described and throwing the hammer toward the string. As soon as the pressure connection between the key and the reciprocator is broken by the action of the motor-impelled bar O upon the jack $f$ the lever H returns to its normal position, the valve $S^4$ closes, the pneumatic opens under the influence of the spring R', (the air reëntering the pneumatic by a small port or hole $S^8$,) and all the parts resume their normal positions in readiness for the next operation. Pneumatics are very well known in keyboard mechanisms. A cylinder and piston might be used instead of a power-bellows. A pressure arrangement may be used instead of an exhaust or vacuum arrangement. The valves may be arranged in a variety of ways. All these things are well known in keyboard mechanisms, and hence require no explanation.

A friction-driver power device may be used to impel the reciprocator or reciprocating friction-driver. An arrangement of this character is illustrated in Fig. 3, in which T is a wheel mounted on a shaft T', so that the two rotate together. The shaft T' is itself suitably mounted and rotated. A contact-piece $T^2$ is pivoted to the lever H and connected by a link $T^3$ with the part G' of the reciprocator. When the key is pressed upon, it acts through the parts before described upon the reciprocator, pressing the parts G and G' down and, through the lever H, pressing the contact-piece $T^2$ against the main friction-driver T. The part T instantly exerts a traction upon the part $T^2$ more or less intense, according to the pressure exerted by the performer upon the key, and moves the parts G and G', which act upon the other parts of the action in the manner already described, throwing the hammer toward the string. As soon as the pressure connection between the key and reciprocator is broken by the action of the motor-impelled bar O upon the jack $f$ the lever H returns to its normal position, so withdrawing the contact-piece $T^2$ from the friction-driver T and leaving the spring R' free to return the various parts to their normal positions. Very obviously it would be possible to form the contact-piece $T^2$ integral with the part G' of the reciprocator. Making them separate, however, permits of the use of a larger friction-driver in an upright piano. In a grand piano they might well be formed integral.

It will be seen that by my invention a single electromagnet or other suitable power device is made to serve for a plurality of keys and hammers, the reciprocator connecting the power device with whatever hammer or hammers require to be moved. In Figs. $1^A$ and $1^B$ the same reciprocator and power device are represented as serving for six hammers and keys; but a single reciprocator and power device may be made to serve for a much larger number; and by the feature of a frictional connection between the power device and the hammers it is possible not only to produce different tones at different instants with different degrees of power, but it is possible even to produce two or more notes simultaneously from the same power device with different degrees of power, for if two keys whose hammers are served by the same power device are depressed simultaneously with different degrees of force in order to produce one note softly and the other note more loudly the hammer corresponding to the key that is pressed softly will be connected with the power device by a weak frictional connection, so that it will receive but little power therefrom and will deliver a light blow upon its string, while the hammer corresponding to the key that is pressed firmly will be connected with the power device by a stronger frictional connection, so that it will receive more power therefrom and will hit its string with greater force and produce a louder tone than its fellow.

It will be understood that the parts G and G' are simply a convenient means, as we may say, of bringing the power device and the hammers near to each other. It will be obvious that the contact-piece $b^3$ $b^3$, &c., and the magnetic armature might be brought into such juxtaposition that the contact-pieces would come directly in contact with the armature. For example, the part G might be made of soft iron, the cores K' K' being placed in a position of close proximity to it, so that they would attract it. This might seem to be a simplified construction; but the objection to it is that the armature is necessarily of some weight to carry the necessary number of magnetic lines and, being of considerable weight, should travel slowly with relation to the contact-pieces $b^3\,b^3$ or their equivalents to avoid a waste of power and other disadvantages. It would obviously be possible also to extend a portion of the pneumatic S or of the contact-piece $T^2$ up to a position of proximity to the contact-pieces $b^3\,b^3$, &c., so that such contact-pieces could be brought into direct frictional connection with the power device without the intervention of the parts G and G'; but the disadvantages would more than counterbalance the benefits to be derived from any such modifications. I wish it to be understood, however, that such changes would not vary from the essentials of my invention.

I wish it to be understood also that while I prefer to use a reciprocating power device (*i. e.*, a power device whose impelling part has a to-and-fro motion) I do not limit myself to the construction having a reciprocator or a reciprocating part for communicating motion to the parts $b^3\,b^3$, for while, as before said, I prefer to impel the parts $b^3\,b^3$ or their equivalents by means of a power-impelled reciprocating part, yet important features of my invention may be carried out by means of a non-reciprocating power device. A little consideration will render this fact clear. The reciprocator shown in Figs. 1 to 3 is in effect a friction-driver normally at rest, but set in motion upon the depressing of the key, the contact-piece being also connected with it by the depressing of the key. This is a main point, and while it is convenient to employ as such a friction-driver a part which moves a short distance to impel the parts $b^3\,b^3$ or equivalents and then returns to its normal position, so that it is ready to act again, the feature of returning back to the point from which it started—in other words, of reciprocating—is not indispensable to the other features.

With respect to the circuit or circuits of the magnet-coils I have illustrated and described what may be called "direct" working, in which the power of the magnets is made and broken by closing and opening the circuit of their coils. No importance is attached, however, to this feature of construction, for it is well known in the art that an electromagnet may be practically magnetized and demagnetized by making and breaking a circuit connected as a low-resistance shunt to its coils and also in other ways, as well as by making and breaking the circuit of the coils themselves. The really important point in this connection is that the depressing of the key shall affect the circuit or circuits in such a manner that a movement of the reciprocator results, and the particular arrangement of the circuit or circuits by which this effect is accomplished may be varied in any way desired.

In the drawings I have illustrated the contact-piece belonging to each hammer as connected directly with its hammer. I consider this the best mode of construction. A reference, however, to the specifications of Letters Patent No. 458,219, granted to me on August 25, 1891, and No. 520,667, granted to me on May 29, 1894, for improvements in pianoforte-actions, (on which prior inventions this present invention is an improvement,) will make clear the fact that the contact-piece may be made entirely separate from the hammer and connected therewith—for instance, by a link—or may, on the other hand, be even more closely connected with the hammer than in the construction figured in the drawings. The means of connecting the contact-piece $b^3$ or its equivalent with the hammer forms no part whatever of my present invention. The parts may be connected in any manner or by any means desired.

In the various constructions illustrated in Figs. 1, 2, and 3 and heretofore described the connection between the hammers and the power device is a frictional connection, and the power device is called into activity by a slight vertical movement of the reciprocator, resulting from the pressure of the key upon the part G. I consider this the best means of connecting the hammers with the power device and of calling the power device into activity, for it absolutely insures that the motor-operated reciprocator G shall not, when a key is depressed, start to move until the part $b^3$ corresponding to the key depressed (and which the reciprocator is to operate,) has been connected with said reciprocator; but I wish it to be understood that it is not the only possible manner of carrying out certain features of my invention. A modification is illustrated in Fig. 4 in which the power device is called into activity by the action of the levers $c$ upon the front rail U of a frame U', which is fulcrumed at $U^2$ and counterbalanced by a weight $U^3$. The rail U lies transverse to the levers $c$ and extends across a plurality of them, so that it is moved by any of such levers when the key corresponding thereto is pressed upon. As illustrated in Fig. 4, said rail U, when any of the keys corresponding to it is depressed, closes the circuit through the contact-points $H^2$ and $H^3$ and coils $K^2\,K^2$, so energizing the cores K' K', which in turn attract the armature K. The same movement of the lever $c$ which affects the rail U and closes the circuit through the electromagnets carries the end of the hammer-butt $b^3$ down below the level of the top of the cross-piece G of the reciprocator, so that said part G, when the armature K moves toward the cores K' K', catches the part $d^3$ and throws the hammer toward the string. The other parts of the device operate in the manner already described. It will be obvious that as the device of Fig. 1 may be modified by the substitution of a pneumatic, as in Fig. 2, or of a friction driver power device, as in Fig. 3, for the electromagnetic arrangement of Fig. 1, so the device of Fig. 4 might be similarly modified by the substitution of a pneumatic or a friction driver power device for its electromagnetic power device.

I have illustrated my invention in the drawings as applied to an upright pianoforte. It is equally applicable, however, to a horizontal or grand pianoforte. This will be readily understood. Suppose, for instance, that any of the types of action illustrated in the drawings is rotated through ninety degrees, so that the string $m$ lies horizontal and above the other parts of the mechanism, and suppose, further, that for the part marked $a$ in the drawings be substituted a bell-crank like those so much used in organs, the vertical arm of said bell-crank standing in the space occupied by the part $a$ in the drawings, and the horizontal arm of said bell-crank being extended toward the right of the inverted drawing, so that the key when pressed upon acts upon the bell-crank and causes it to press upon the various parts $n^2$ $d$ $e$ $f$ $c$ $b^3$, &c., in the manner already described, causing the action to operate, as already described, and suppose, further, that the various parts are counterbalanced or spring-pressed, as required by the changed position. This would convert the upright action shown into a horizontal or grand action.

Very many modifications may be made without departing from the essentials of my invention, which are set forth in the statement of claim.

Thus far I have described my invention merely as an improvement in pianoforte-actions; but important features of my invention are in fact applicable to a wide class of keyboard mechanisms, in fact to keyboard mechanisms generally. Thus, for example, it has been already pointed out that the hammer $b$ may be connected with the part $b^3$ either in the direct fashion illustrated in the drawings or through intermediate links and levers. Also instead of connecting the part $b^8$ to actuate the hammer of a pianoforte it may be connected in other keyboard instruments to actuate the part or parts to which the key corresponds and for the actuating of which it is depressed.

In other applications of mine filed since the filing of this application I illustrate power actions several of which are in many essential particulars similar to the action herein described, but applied with such modifications and alterations as are necessary to other keyboard mechanisms than pianofortes—to type-writing machines and type-setting machines, for example. In every such case all the claims of each such application are restricted to combinations or subcombinations which belong distinctively and inevitably to a type-writing machine, type-setting machine, printing-telegraph or other printing instrumentality and to such machines only, and each of which includes elements that are characteristic of such machines and of such machines only; but in this application I desire to protect not only my invention as applied to a pianoforte, but also those underlying features that are common both to the present application and the applications above mentioned—those combinations and subcombinations which may be used in other keyboard instruments as well as in pianofortes. When, therefore, in any of the paragraphs of claim at the end hereof the claim is expressly limited to a pianoforte-action, I wish to be understood as limiting such claim to pianoforte-actions only; but each and every paragraph of claim which is not by express words limited to a pianoforte-action covers the combination which it sets forth in other keyboard instruments generally as well as in pianofortes and is by no means limited to a pianoforte.

In a pianoforte it is very important that the action should be sympathetic or sensitive—that is to say, the power which the motor puts into the hammer should be proportional to the pressure exerted by the operator upon the key. The frictional connection between the hammer and the motor resulting from the construction illustrated in Figs. 1 to 4 makes the action sympathetic; but in some other sorts of keyboard instruments it is important that the pressure which the motor puts into the part which it actuates and which is connected with it by the key depressed should be uniform and independent of the pressure exerted by the operator upon the key. Now the device of Fig. 4, in which the part $b^3$ corresponding to the key is not pressed against the reciprocator to establish a frictional connection with said reciprocator and the motor controlling said reciprocator, (as in the devices of Figs. 1 to 3,) but is simply thrown by the action of the key into the path of movement of the reciprocator, so that said reciprocator gives movement to it, is non-sympathetic and while less suitable for use in a pianoforte-action is the more suitable for use in other keyboard instruments in which uniformity of action is desirable.

In various places in the statement of claim at the end hereof I speak of a reciprocator. By the word "reciprocator" I refer to a part or body which is adapted to move to and fro alternately. I use the words "reciprocating frame" also with reference to a frame part or body (the particular shape or arrangement of which, as before said, is not material) which is adapted and arranged to move to and fro alternately. The form of reciprocating frame illustrated in the drawings is pivoted to move to and fro about a center, and that is a good arrangement; but any other suitable means of mounting desired may be employed instead. Whether the reciprocating frame be formed of several parts suitably held together or be made in one single piece is not essential.

I have shown, it will be observed, three different forms of motor combined with other parts for carrying out my invention—to wit, (a) an electromagnetic motor in Figs. 1 and 4 that is a motor whose activity depends upon and is derived from the electric current; (b) a pneumatic motor in Fig. 2—that is to say, a motor which is operated by fluid under pressure; and (c) a kinetic motor in Fig. 3 that is a motor which depends for its activity upon the power of matter in motion; but except in those paragraphs of claim in which an electromagnet or electromagnetic motor is by some apt words made an element of the combination I do not limit myself to any particular form of motor, and any one of the forms of motor shown or any other motor device whatever that is suitable for the purpose may be used instead.

By the term "key-depressing," which is used in certain of the paragraphs of claim at the end hereof, I mean depressing of a key.

In some of the paragraphs of claim at the end hereof I speak of the hammer being connected with the reciprocator and in others of its being connected with the motor. Now in the preferred construction illustrated in the drawings the hammer is connected when the corresponding key is depressed both with the reciprocator and with the motor. It is connected more directly with the reciprocator and less directly with the motor; but it is connected with both of them by the same action of the key. I have already explained that it would be possible to modify the construction so that the part $b^3$ would be connected with the motor without the intervention of any reciprocator, and when I speak in any paragraph of claim of connecting the hammer with a motor or electromagnet and do not mention any reciprocator I wish it to be understood that I mean to claim the combination set forth in such paragraph whether any reciprocator be used or not; but when, on the other hand, in a paragraph of claim I speak of a reciprocator or a reciprocating frame and a motor in such paragraph I limit myself to the construction in which there is both a motor and a reciprocator operated thereby. So, also, in one paragraph of claim I speak, in substance, of the motor operating to free the jacks and in another paragraph of the motor and a frame acting to free the jacks. Now a reference to the drawings will show that with the details of construction there figured both the motor and the frame act to free the jacks, that the releasing-frame acts directly upon the jacks, while the motor acts to impel said frame. Also it will be borne in mind that a thing acting may act mediately or immediately. With the details of construction illustrated in the drawings the motor acts upon the jacks mediately, while the releasing-frame acts upon them immediately—that is, directly; but these details of construction may be modified. It is not indispensable that the motor act upon the jacks through a releasing-frame such as is figured in the drawings, nor is it indispensable, using a releasing-frame to free the jacks, that that frame should be impelled by a motor device. It will be understood, therefore, that each claim is limited according to the elements and mode of operation specified in it and that an element which is expressed in one claim is not, generally speaking, to be read into a paragraph of claim from which it has been omitted.

I have shown, it will be observed, in the preferred construction illustrated in the drawings a single motor and a single reciprocating frame common to a plurality of the keys controlled by said keys and serving to actuate the parts corresponding to said keys, serving for each key when that key is depressed; but obviously we might use a motor and reciprocator, as shown, but serving for a single key and the parts controlled by said key only, using as many motor devices or reciprocators as there were keys. Such a construction would be more expensive and bulky than that illustrated in the drawings but it would have the advantage over the prior art (which the preferred construction also has) of rendering the action sympathetic—that is, of causing the power communicated by the electromagnet (or other motor that is normally at rest and which is called into action by the depressing of the key) and the hammer or other part corresponding to the key depressed and for the actuating of which the key is depressed to be proportional to the pressure exerted by the operator upon the key. When, therefore, in any paragraph of claim at the end hereof I make a key an element of the combination, I do not limit myself in the combination set forth in such claim to using a single motor for a plurality of keys, but claim the combination, broadly, as set forth in such paragraph of claim; but when in another paragraph of claim I make a plurality of keys an element, along with the motor and a reciprocator serving in common for said keys, there I limit myself to the preferred feature of making a single motor device serve for a plurality of keys.

I have shown, it will be observed, in Figs. 1, 2, and 3, respectively, three radically-different kinds of motor-controlling mechanisms, the differences in said motor-controlling mechanisms being necessitated by the differences in the nature of the motor devices which they respectively control; but also it will be observed that I have shown in Figs. 1 and 4 two radically different arrangements of motor-controlling mechanism for the same kind of motor. In the construction illustrated in Fig. 1 (and the same is true of the constructions illustrated in Figs. 2 and 3) the reciprocator is pivoted to a circuit-closing device or other motor-controlling device, and the key, when depressed, presses the contact-piece $b^3$ against the reciprocator, which in turn gives movement to the motor-controlling device, so that that brings the motor into action to operate the reciprocator. This construction has the great merit of absolutely insuring that the reciprocator shall not start until the part $b^3$ operated by the key depressed has been connected with it. In the other form of device (illustrated in Fig. 4) the reciprocator is mounted on a pivot whose bearing does not move, and the motor is controlled by the frame U U', operated by the keys $a\ a$, through the levers $c\ c$. This latter construction, while lacking the advantage before mentioned, has the other advantages of simplicity and solidity in the mounting of the reciprocator G. Also I show a single releasing-frame common to a plurality of jacks $f\ f$ for freeing said jacks each as required.

I consider this the preferable construction; but obviously the releasing-frame or equivalent device might be used, serving for a single jack only, in which case the number of such releasing-frames would of course have to be increased. Also the feature of freeing the jacks $f\ f$ by the action of the very same motor that operates the frame G G' is a useful feature of my invention; but it is not indispensable to certain other features of the invention, which might be used without it. Thus, for instance, I might free the jacks by some other means than the motor which impels the frame G G'.

I prefer to use in my releasing mechanism jacks, with means of some suitable sort for freeing them. I consider the construction shown as good as, if not better than, anything else that I know of for the purpose; but I have, in fact, contrived several forms of releasing mechanism not including any sort of jacks, so that it will be understood, when I speak in substance or effect in any paragraph of claim at the end hereof of releasing means or releasing mechanism or means or mechanism for freeing a named part without mentioning a jack or jacks, that I claim the combination set forth in such paragraph of claim broadly, so far as the releasing mechanism is concerned; but when in any paragraph of claim I make jacks an element of the combination I in such paragraph limit myself to the jack construction.

In various places in this specification, particularly in some of the paragraphs of claim at the end hereof, I speak of a reciprocating frame normally at rest and tending when moved from its normal position to return thereto, or I speak of a frame normally inactive, tending when moved from its normal position to return thereto, or I speak of a circuit-controlling device or a motor-controlling device tending when moved from its normal position to return thereto, or I use some other form of words of similar import. One means for causing a frame or a motor-controlling device or a circuit-controlling device to tend when moved from its normal position to return thereto is a spring. Thus in Figs. 1, 2, 3, and 4 the spring R' causes the frame G G' to tend when moved from its normal position to return thereto. Another means of causing a frame or a motor-controlling device or a circuit-controlling device to tend when moved from its normal position to return thereto is to arrange said frame or device in such a way that its own weight tends to bring it back to its normal position. Thus in Fig. 4 the frame U U' is arranged in such a manner that when moved from its normal position its own weight tends to return it thereto; but by the words "tending when moved from its normal position to return thereto," or other words of equivalent meaning, I do not limit myself to using merely a spring or a weight, but I include under those words any device, mechanism, construction, or arrangement of parts whereby when the frame, motor-controlling device, circuit-controlling device, or other similar part has been moved from its normal position a force is brought into action as a result of such movement from the normal position tending to cause said frame or other part to return to its normal position.

In various places in this specification, and particularly in certain of the paragraphs of claim at the end hereof, I speak of restoring the motor to its normal position. By this language I mean that that part of the motor which moves when the motor acts is restored to its normal position. So when I speak of a motor-controlling device or a circuit-controlling device being restored to its normal position or permitted to return to its normal position I mean that that part of the motor-controlling device or circuit-controlling device which was moved from its normal position is restored to its normal position or permitted to return toward its normal position, for obviously some portions of the motor, and it may be some portions of the motor-controlling device or circuit-controlling device, do not move from their normal positions. The construction illustrated in the drawings has, it will be observed, (a) means whereby the power is cut off, so that the motor is rendered inactive; (b) means whereby the reciprocating frame is permitted to return toward its normal position in advance of the release of the key; (c) means whereby the motor-controlling device is left free to return toward its normal position in advance of the release of the key, and (d) means whereby the key-corresponding member connected with the reciprocating frame and motor by the key depressed is released and permitted to return toward its normal position in advance of the release of the key. Now it is true that the same combination of parts accomplishes all these results in the structure I have shown in the drawings, and this simplicity of the mechanism is one of its merits; but, in fact, means might be used for one or more of the purposes enumerated without using means for the others. Not only might I modify the releasing mechanism in very many ways, but if in any case it were desired I could dispense with the releasing mechanism altogether—as, for instance, by simply disconnecting the link $O^3$ from either the releasing-frame or the reciprocating frame—in which case (the part being omitted and the function along with it) no one of the releasing operations mentioned above would take place until the key itself had been released. The releasing-frame illustrated in the drawings, and consisting of the striking-bar O, the arm O', and the shaft or axle O², is one convenient form of releasing-frame; but I attach no importance to its details of construction, which may be varied to any extent. Any equivalent may be substituted for it. Moreover, as before pointed out, some other form of releasing device, not being a releasing-frame, might be used in carrying out certain portions of my invention.

Such are a few of the endless number of modifications that may be made which dispense with some feature of my invention while retaining some other feature or features of it.

It will be understood that I do not limit myself to the details of construction illustrated in the drawings; but what I do limit myself to are the various combinations and subcombinations set forth in the statement of claim at the end hereof.

I do not claim herein anything that is claimed in any of my pending applications, Serial No. 684,880, filed June 30, 1898; Serial No. 700,234, filed December 24, 1898, and Serial No. 735,813, filed November 4, 1899, or previous patents, No. 566,442, dated August 25, 1896; Nos. 600,119 and 600,120, dated March 1, 1898; No. 604,001, dated May 10, 1898, and No. 605,777, dated June 14, 1898, and all of which have issued upon applications filed subsequent to this application.

What, therefore, I do claim as of my own invention, and desire to secure by Letters Patent upon this application, is—

1. In combination, in a keyboard mechanism, (a) a key at the keyboard; (b) a motor, normally inactive; (c) motor-controlling means operated by said key, and acting when said key is depressed, to bring said motor into action; and (d) means thereupon acting to restore said motor to its normal position in advance of the release of the key.

2. In combination in a keyboard mechanism, (a) a key at the keyboard; (b) a motor, normally inactive; (c) a controlling device for the motor, normally in position to render said motor inactive; said motor-controlling device tending when moved from its normal position to return thereto; the key serving when depressed to operate said motor-controlling device to bring the motor into action; and (d) means, thereupon acting to permit said motor-controlling device to return to its normal position in advance of the release of the key.

3. In combination in a keyboard mechanism, (a) a key at the keyboard; (b) a motor, normally inactive; (c) a controlling device for the motor, normally in position to render said motor inactive; said motor-controlling device tending when moved from its normal position to return thereto; the key serving when depressed to operate said motor-controlling device to bring the motor into action; and (d) means operated by said motor, and acting when the key is depressed and said motor thereby brought into action, to permit the motor-controlling device to return toward its normal position in advance of the release of the key.

4. In combination in a keyboard mechanism, (a) a key at the keyboard; (b) a motor, normally inactive; (c) a controlling device for the motor, normally in position to render said motor inactive; said motor-controlling device tending when moved from its normal position to return thereto; the key serving when depressed to operate said motor-controlling device to bring the motor into action; (d) means thereupon acting to permit said motor-controlling device to return to its normal position in advance of the release of the key; and (e) means thereupon acting to restore said motor to its normal position in advance of the release of the key.

5. In combination in a keyboard mechanism, (a) a key at the keyboard; (b) a motor, normally inactive; (c) a controlling device for the motor, normally in position to render said motor inactive; said motor-controlling device tending when moved from its normal position to return thereto; the key serving when depressed to operate said motor-controlling device to bring the motor into action; (d) means operated by said motor, and acting when the key is depressed and said motor thereby brought into action, to permit the motor-controlling device to return toward its normal position in advance of the release of the key; and (e) means thereupon acting to restore said motor to its normal position in advance of the release of the key.

6. In combination in a keyboard mechanism, (a) a key at the keyboard; (b) a motor normally inactive; (c) means for starting said motor when said key is depressed; and (d) means acting automatically to stop said motor in advance of the release of said key; said stopping means including a tripping device operated by the motor aforesaid.

7. In combination in a keyboard mechanism, (a) a key at the keyboard; (b) a motor normally at rest; (c) a controlling device for said motor; (d) a jack intermediate said key and said motor-controlling device, wherethrough said key acts, when depressed, upon said motor-controlling device to bring said motor aforesaid into action; and (e) means acting to free said jack in advance of the release of the key depressed, thereby to permit the motor-controlling device to return toward its normal position; said motor-controlling device thereupon operating to render the motor inactive in advance of the release of the key depressed.

8. In combination in a keyboard mechanism, (a) a key at the keyboard; (b) a motor; (c) a controlling device for said motor; (d) a jack intermediate said key and said motor-controlling device, wherethrough said key acts when depressed, upon said motor-controlling device to bring the motor into action; and (e) a connection between said jack and said motor whereby said motor is made to free said jack, thereby to permit the motor-controlling device aforesaid to return toward its normal position in advance of the release of the key depressed.

9. In combination in a keyboard mechanism, (a) a key at the keyboard; (b) an electromagnet; (c) a circuit-controlling device for said magnet; said circuit-controlling device being normally in position to render said magnet inactive, and tending when moved from such normal position to return thereto; said circuit-controlling device being operated by the key and serving when the key is depressed to bring the magnet aforesaid into action; and (d) means acting then to permit said circuit-controlling device to return toward its normal position in advance of the release of the key; whereby said magnet is rendered inactive until another key-depressing.

10. In combination in a keyboard mechanism; (a) a key at the keyboard; (b) a circuit; (c) a source of electric current; (d) a circuit-closing device for said circuit, normally in open-circuit position, and tending when moved from the open-circuit to the closed-circuit position to return to its normal position; said circuit-closing device being operated by the key and serving when said key is depressed to permit the current to flow in the circuit aforesaid; and (e) means acting when said key is depressed, to permit said circuit-closing device to return toward its normal position in advance of the release of the key.

11. In combination in a keyboard mechanism, (a) a jack; (b) a circuit-controlling device operated through said jack; (c) an electromagnet affected by said circuit-controlling device, and acting in turn upon the jack aforesaid to affect the circuit-controlling device aforesaid.

12. In combination in a keyboard mechanism, (a) a circuit, including an electromagnet; (b) a device for controlling said circuit, said device being normally in position to render said magnet inactive; (c) a key at the keyboard; (d) a connection, releasable by the electromagnet, intermediate said key and said circuit-controlling device, whereby said key acts when depressed upon said circuit-controlling device to bring said magnet into action; said magnet thereupon acting on said connection to permit said circuit-controlling device to return toward its normal position in advance of the release of the key.

13. In combination in a keyboard mechanism, (a) an electromagnet; (b) a circuit-closing device therefor, normally in position to render said electromagnet inactive; (c) a key at the keyboard; (d) a jack, releasable by the magnet, wherethrough said key when it is depressed, acts upon the circuit-closing device to bring the electromagnet into action; said magnet thereupon acting upon the jack to permit the circuit-closing device to return toward its normal position in advance of the release of the key.

14. In combination in a keyboard mechanism, (a) a motor, normally inactive; (b) a plurality of keys at a keyboard, alike controlling said motor; said keys each acting when depressed, to bring said motor into action; and (c) means acting, when any of said keys is depressed, to cut off the power from said motor in advance of the release of the key depressed.

15. In combination in a keyboard mechanism, (a) a motor, normally inactive; (b) a plurality of keys at a keyboard, alike controlling said motor; said keys each acting when depressed to bring said motor into action; and (c) means operated by said motor itself, acting when any of said keys is depressed and said motor thereby brought into action, to render said motor inactive, in advance of the release of the key depressed.

16. In combination in a keyboard mechanism, (a) a motor normally inactive; (b) a plurality of keys at a keyboard alike controlling said motor; (c) means for starting said motor whenever any of said keys is depressed; and (d) means acting automatically to stop said motor in advance of the release of the key depressed, said stopping means including a plurality of releasing devices, a releasing device for each of the keys controlling said motor, and means operated by said motor for freeing said releasing devices.

17. In combination in a keyboard mechanism, (a) a motor normally inactive; (b) a plurality of keys at a keyboard; (c) a controlling device for said motor; said controlling device being common to a plurality of the keys aforesaid, each of said keys when depressed operating said controlling device to bring said motor into action; and (d) means acting when a key is depressed, to render said motor aforesaid inactive in advance of the release of the key depressed.

18. In combination in a keyboard mechanism, (a) a motor normally inactive; (b) a plurality of keys at a keyboard; (c) a controlling device for said motor; said controlling device being common to a plurality of the keys aforesaid, each of said keys when depressed operating said controlling device to bring said motor into action; and (d) means operated by said motor acting when a key is depressed and said motor thus brought into action, to render said motor inactive in advance of the release of the key depressed.

19. In combination in a keyboard mechanism, (a) a motor normally inactive; (b) a plurality of keys at a keyboard; (c) a controlling device for said motor, common to a plurality of the keys aforesaid; (d) connections intermediate each of said keys and said motor-controlling device, wherethrough when a key is depressed it operates said motor-controlling device; and (e) means acting on the connections last mentioned to permit said motor-controlling device to return toward its normal position in advance of the release of the key depressed; said motor-controlling device thereupon serving by such return movement, to render the motor aforesaid inactive.

20. In combination in a keyboard mechanism, (a) a motor normally inactive; (b) a plurality of keys at a keyboard alike controlling said motor; (c) jacks operated by said keys; (d) means operated by said jacks whereby when a key is depressed the motor aforesaid is brought into action; and (e) a device common to a plurality of said jacks, operating to free said jacks, each as required.

21. In combination in a keyboard mechanism, (a) a motor normally inactive; (b) a plurality of keys at a keyboard; (c) a controlling device for said motor; said controlling device being common to a plurality of the keys aforesaid; (d) jacks intermediate said keys and said motor-controlling device, wherethrough said keys, when depressed, operate said motor-controlling device to bring the motor aforesaid into action; and (e) a releasing-frame operated by said motor and acting, when a key is depressed, upon the jack operated by said key to permit the motor-controlling device aforesaid to return toward its normal position; said motor-controlling device acting by such return movement to render said motor device inactive.

22. In combination, (a) a keyboard; (b) jacks controllable independently one of another from said keyboard; and (c) a device controlled from said keyboard and common to a plurality of said jacks, for freeing said jacks, each as required.

23. In combination, (a) a keyboard; (b) a plurality of jacks controlled from said keyboard; and (c) a motor device also controlled from said keyboard, and acting to free said jacks.

24. In combination in a keyboard mechanism, (a) a motor; (b) a plurality of jacks; and (c) a controlling device for said motor, common to a plurality of said jacks and operated by them.

25. In combination in a keyboard mechanism, (a) a motor; (b) a plurality of jacks; (c) a controlling device for said motor, common to a plurality of said jacks and operated by them; and (d) means operated by said motor for freeing said jacks, each as required.

26. In combination in a keyboard mechanism, (a) a keyboard of keys; (b) jacks equal in number to said keys, and operated by them, a jack for each key of said keyboard; and (c) a releasing-frame common to a plurality of said jacks, for freeing said jacks, each as required.

27. In combination in a keyboard mechanism, (a) a plurality of keys at a keyboard; (b) jacks corresponding to said keys and operated by them, a jack for each key; and (c) a device common to a plurality of said jacks, for freeing said jacks each as required; said device being controlled by the same keys which control said jacks.

28. In combination in a keyboard mechanism, (a) a plurality of keys at a keyboard; (b) jacks corresponding to said keys and operated by them, a jack for each key; (c) levers operated by said keys through said jacks; and (d) a device common to a plurality of said jacks and controlled by them, operating to free said jacks, each as required.

29. In combination in a keyboard mechanism, (a) an electromagnet, normally inactive; (b) a plurality of keys at the keyboard; (c) circuit-controlling means operated by each of said keys independently of the other keys, said means acting whenever any of said keys is depressed, to bring the magnet aforesaid into action; and (d) means acting when any of said keys is depressed, to cut off current from said electromagnet in advance of the release of the key depressed; whereby said magnet is rendered inactive until another key-depressing.

30. In combination in a keyboard mechanism, (a) an electromagnet, normally inactive; (b) a plurality of keys at the keyboard; (c) circuit-controlling means operated by said keys, whereby when any of said keys is depressed said magnet is brought into action; and (d) means supplemental to said circuit-controlling means, acting when any of said keys is depressed, to cut off current from the magnet aforesaid, in advance of the release of the key depressed, whereby said magnet is rendered inactive until another key-depressing.

31. In combination in a keyboard mechanism, (a) an electromagnet; (b) a plurality of keys at the keyboard; (c) a circuit-controlling device for said electromagnet; said circuit-controlling device being normally in position to render said magnet inactive; said circuit-controlling device being operated by each of the keys aforesaid independently of the other keys, and acting whenever any of said keys is depressed, to close the circuit of the electromagnet; and (d) a tripping device for said circuit-controlling device, operating when the key is depressed and the magnet thereupon brought into action, to permit said circuit-controlling device to return toward its normal position in advance of the release of the key depressed.

32. In combination, (a) a keyboard; (b) jacks controllable, independently one of another, from said keyboard; and (c) an electromagnet, controlled from said keyboard and acting to free a plurality of said jacks, each jack as required.

33. In combination in a keyboard mechanism, (a) a plurality of jacks; (b) an electromagnet; (c) circuit-controlling means for said magnet operated through said jacks; said magnet acting in turn to free said jacks.

34. In combination, (a) a keyboard; (b) an electromagnet; (c) a plurality of jacks, operated from said keyboard; and (d) a controlling device for the circuit of said electromagnet; said circuit-controlling device being common to a plurality of said jacks, and operated by them.

35. In combination in a keyboard mechanism, (a) a plurality of jacks; (b) an electromagnet; (c) circuit-controlling means for said magnet operated by said jacks; and (d) a releasing-frame common to a plurality of said jacks and acting to free said jacks, each as required.

36. In combination in a keyboard mechanism, (a) a plurality of jacks; (b) an electromagnet; (c) circuit-controlling means for said magnet operated by said jacks; and (d) a device common to a plurality of said jacks for freeing said jacks, each as required, said device being itself operated by the electromagnet aforesaid.

37. In combination in a keyboard mechanism, (a) an electromagnet; (b) a plurality of jacks; (c) a controlling device for the circuit of said electromagnet; said circuit-controlling device being common to a plurality of said jacks and operated by them; and (d) means operated by said magnet for freeing said jacks each as required.

38. In combination in a keyboard mechanism, (a) an electromagnet; (b) a plurality of jacks; (c) means for controlling the circuit of said electromagnet; said circuit-controlling means being operated by said jacks; and (d) a pivoted frame receiving movement from the magnet aforesaid and acting on the jacks aforesaid to free said jacks each as required.

39. In combination in a keyboard mechanism (a) a circuit, including an electromagnet; (b) a plurality of keys at a keyboard; (c) a device for controlling said circuit, said circuit-controlling device being normally in position to render the magnet inactive, and being common to a plurality of the keys aforesaid; (d) connections, releasable by the magnet intermediate said keys and said circuit-controlling device, wherethrough said keys each when it is depressed, acts upon said circuit-controlling device to bring the magnet aforesaid into action; said magnet thereupon acting upon the connection intermediate the key depressed and the circuit-controlling device aforesaid to permit said circuit-controlling device to return toward its normal position in advance of the release of the key depressed.

40. In combination in a keyboard mechanism; (a) an electromagnet; (b) keys at a keyboard controlling said magnet; (c) a circuit-closing device for said magnet; said circuit-closing device being normally in position to render said magnet inactive and being common to a plurality of the keys aforesaid; (d) jacks intermediate said keys and said circuit-closing device, each of said keys acting, when depressed, through the corresponding jack upon said circuit-closing device to bring the magnet aforesaid into action; and (e) a releasing-frame operated by said magnet for freeing said jacks, said releasing-frame acting when a key is depressed, upon the jack operated by said key, to permit the circuit-closing device aforesaid to return toward its normal position in advance of the release of the key depressed.

41. In combination in a keyboard mechanism, (a) a reciprocating frame normally at rest and having a normal position to which it tends to return, when displaced; (b) a motor for actuating said frame; said motor being normally inactive; (c) a key at the keyboard, serving when depressed, to cause said motor to move said frame from its normal position; and (d) means receiving movement from the motor aforesaid, and acting when the key is depressed and the frame aforesaid moved from its normal position by said motor, to permit said frame to return toward its normal position in advance of the release of said key.

42. In combination in a keyboard mechanism, (a) a reciprocating frame normally at rest and having a normal position to which it tends to return, when displaced; (b) a motor for actuating said frame; (c) a key at the keyboard, serving when depressed, to cause said motor to move said frame from its normal position; and (d) means connected with said frame and acting when the key aforesaid is depressed and said frame moved from its normal position by the motor aforesaid, to permit said frame to return toward its normal position in advance of the release of said key.

43. In combination in a keyboard mechanism, (a) a reciprocating frame normally at rest and having a normal position to which it tends to return, when displaced; (b) a motor for actuating said frame; said motor being normally inactive; (c) a key at the keyboard; (d) a controlling device for said motor said controlling device having a normal position to which it tends to return when displaced; (e) a connection intermediate said key and the motor-controlling device, wherethrough said key when depressed gives movement to said motor-controlling device to bring the motor aforesaid into action; and (f) means acting upon said connection to permit both the motor-controlling device and the frame aforesaid to return toward their normal positions in advance of the release of the key depressed.

44. In combination in a keyboard mechanism, (a) a reciprocating frame normally at rest and having a normal position to which it tends to return, when displaced; (b) a motor for actuating said frame, said motor being normally inactive; (c) a key at a keyboard; (d) a controlling device for said motor said controlling device having a normal position to which it tends to return when displaced; (e) a jack intermediate the key and said motor-controlling device, wherethrough said key when depressed acts upon said motor-controlling device, to bring the motor aforesaid into action to give movement to the frame aforesaid; said motor thereupon acting upon the jack to permit the motor-controlling device to return toward its normal position in advance of the release of the key; said motor-controlling device operating by such return movement to render said motor inactive, whereby the frame aforesaid is permitted to return toward its normal position in advance of the release of the key depressed.

45. In combination in a keyboard mechanism, (a) a reciprocating frame normally at rest and having a normal position to which it tends to return, when displaced; (b) an electromagnet for actuating said frame; (c) a key at the keyboard, serving when depressed to bring said electromagnet into action to move said frame from its normal position; and (d) means receiving movement from said electromagnet and acting (when the key is depressed and the electromagnet thus brought into action to move the frame aforesaid from its normal position,) to permit said frame to return toward its normal position in advance of the release of said key.

46. In combination in a keyboard mechanism, (a) a reciprocating frame normally at rest and having a normal position to which it tends to return, when displaced; (b) an electromagnet for actuating said frame; (c) a key at the keyboard; (d) circuit-controlling means operated by said key and acting when said key is depressed, to bring the magnet aforesaid into action to operate the frame aforesaid; and (e) means connected with said frame, acting when said key is depressed and said magnet thus brought into action, to cut off current from said magnet, thereby to permit the frame aforesaid to return toward its normal position in advance of the release of the key depressed.

47. In combination in a keyboard mechanism, (a) a reciprocating frame normally at rest and having a normal position to which it tends to return, when displaced; (b) an electromagnet for actuating said frame; (c) a key at the keyboard; (d) a device controlling the circuit of said magnet said circuit-controlling device having a normal position to which it tends to return when displaced; (e) a mechanical connection intermediate said key and said circuit-controlling device, wherethrough movement is communicated from said key when said key is depressed, to said circuit-controlling device, to bring said electromagnet into action to actuate the frame aforesaid; and (f) means acting on said connection when the key aforesaid is depressed to permit said circuit-controlling device to return toward its normal position, said circuit-controlling device operating by such return movement to cut off current from the electromagnet aforesaid in advance of the release of the key.

48. In combination in a keyboard mechanism, (a) a reciprocating frame normally at rest and having a normal position to which it tends to return, when displaced; (b) an electromagnet for actuating said frame; (c) a key at a keyboard; (d) a device controlling the circuit of the magnet aforesaid said circuit-controlling device having a normal position to which it tends to return when displaced; (e) a jack intermediate said key and said circuit-controlling device, wherethrough said key when it is depressed acts upon said circuit-controlling device to bring the magnet into action, so that said magnet gives movement to the frame aforesaid; said magnet thereupon acting upon said jack to permit the circuit-controlling device aforesaid to return toward its normal position in advance of the release of the key depressed; said circuit-controlling device operating by such return movement, to render the magnet inactive, so as to permit the frame aforesaid to return toward its normal position in advance of the release of the key depressed.

49. In combination in a keyboard mechanism, (a) a reciprocating frame normally at rest and having a normal position to which it tends to return, when displaced; (b) a motor for actuating said frame; (c) a plurality of keys at a keyboard each controlling independently of the other keys, said frame; said keys each acting when depressed to bring the motor aforesaid into action to move said frame from its normal position; and (d) means acting when any of said keys is depressed and said motor thus brought into action to move said frame from its normal position as aforesaid, to permit said frame to return toward its normal position in advance of the release of said key.

50. In combination in a keyboard mechanism, (a) a reciprocating frame, normally at rest and having a normal position to which it tends to return, when displaced; (b) a motor for actuating said frame; (c) a plurality of keys at a keyboard, controlling said frame; said keys each acting when depressed to bring the motor aforesaid into action to move said frame from its normal position; and (d) means operated by said motor, and acting when any of said keys is depressed to move said frame from its normal position, to permit said frame to return toward its normal position in advance of the release of the key depressed.

51. In combination in a keyboard mechanism, (a) a reciprocating frame normally at rest and having a normal position to which it tends to return, when displaced; (b) a motor for actuating said frame; (c) a plurality of keys at a keyboard; (d) a controlling device for the motor, said motor-controlling device being common to and operated by a plurality of the keys aforesaid and having a normal position to which it tends to return when displaced, said motor-controlling device tending when moved from its normal position by the action of any of the keys aforesaid, to return to its normal position; (e) jacks intermediate said keys and said motor-controlling device, a jack for each key, wherethrough said key when it is depressed, acts upon said motor-controlling device to bring the motor into action to operate the frame aforesaid; and (f) means controlled by said motor acting when a key is depressed, to free the jack operated by said key, thereby to permit the motor-controlling device aforesaid to return toward its normal position in advance of the release of said key; said motor-controlling device operating by such return movement to permit the return of the frame aforesaid toward its normal position in advance of the release of the key depressed.

52. In combination in a keyboard mechanism, (a) a reciprocating frame, normally at rest and having a normal position to which it tends to return, when displaced; (b) an electromagnet for actuating said frame; (c) a plurality of keys at the keyboard, each controlling independently of the other keys, said frame; said keys each acting whenever it is depressed to bring the electromagnet into action to move said frame from its normal position; and (d) means acting, when any of said keys is depressed and said magnet thus brought into action to move said frame from its normal position, to permit said frame to return toward its normal position in advance of the release of said key.

53. In combination in a keyboard mechanism, (a) a reciprocating frame, normally at rest and having a normal position to which it tends to return, when displaced; (b) an electromagnet for actuating said frame; (c) a plurality of keys at the keyboard, alike controlling said frame; each of said keys acting when depressed, to bring the electromagnet aforesaid into action to move said frame from its normal position; and (d) means operated by said electromagnet, acting when a key is depressed, and said electromagnet thereby brought into action to operate said frame, to permit said frame to return toward its normal position in advance of the release of the key depressed.

54. In combination in a keyboard mechanism, (a) a reciprocating frame, normally at rest; (b) an electromagnet for actuating said frame; (c) a plurality of keys at the keyboard alike controlling said frame; (d) a circuit-controlling device common to a plurality of said keys, operated by them, and serving when any of said keys is depressed, to bring the electromagnet aforesaid into action to operate the frame aforesaid; (e) means controlled by said keys through said circuit-controlling device, operating to break the circuit of the electromagnet aforesaid in advance of the release of the key depressed.

55. In combination in a keyboard mechanism, (a) a reciprocating frame normally at rest and having a normal position to which it tends to return, when displaced; (b) an electromagnet for actuating said frame; (c) a plurality of keys at the keyboard alike controlling said frame, each of said keys serving when depressed to bring said electromagnet into action to move said frame from its normal position; (d) a circuit-controlling device common to a plurality of said keys, said circuit-controlling device having a normal position to which it tends to return when displaced; (e) connections between said keys and said circuit-controlling device, whereby each key, when depressed, gives movement to said circuit-controlling device to bring the electromagnet aforesaid into action to operate the frame aforesaid, and (f) means acting when a key is depressed to release the connection between said key and said circuit-controlling device, thereby to permit said circuit-controlling device to return toward its normal position in advance of the release of the key; said circuit-controlling device serving by such return movement to permit the frame aforesaid to return toward its normal position.

56. In combination in a keyboard mechanism, (a) a reciprocating frame normally at rest; (b) an electromagnet for actuating said frame; (c) a plurality of keys at a keyboard; (d) a device controlling the circuit of said electromagnet, said circuit-controlling device having a normal position to which it tends to return when displaced; (e) jacks intermediate the keys and said circuit-controlling device, a jack for each key that operates said circuit-controlling device, wherethrough said key when depressed, acts upon said circuit-controlling device to bring the magnet into action to operate the frame aforesaid; (f) a device common to a plurality of said jacks acting when one of the keys aforesaid is depressed and the magnet thus brought into action to operate the frame aforesaid, to free the jack corresponding to the key depressed, thereby to permit the circuit-controlling device aforesaid to return toward its normal position in advance of the release of the key depressed.

57. In a keyboard mechanism and in combination, (a) a reciprocating frame, normally at rest; (b) a motor for impelling said frame; (c) a key; (d) a member corresponding to said key; said member being normally disconnected from the frame aforesaid and having a normal position to which it tends to return when displaced; said key acting when depressed to cause said member to be connected with said frame; and (e) controlling means for the motor aforesaid; said controlling means being operated by the key aforesaid; said motor acting when said key has been depressed and is at rest in its depressed position to actuate the frame aforesaid and the key-corresponding member connected with said frame by the depressing of the key aforesaid, moving said key-corresponding member from its normal position to the limit of its movement.

58. In combination, (a) a reciprocating frame normally at rest; (b) members, to which said frame is common, and for the impelling of which members each as required, said frame serves, each of said members having a normal position to which it tends to return when displaced; (c) keys at a keyboard, corresponding to said members, a key for each of said members; (d) a motor for actuating the frame aforesaid; each of the keys aforesaid acting when depressed both to connect the corresponding one of the members aforesaid with said frame, and to bring the motor into action to impel said frame and the member connected with said frame by the action of the key depressed, so that said motor impels said member from its normal position to the limit of its movement.

59. In combination, (a) a reciprocating frame normally at rest; (b) members, to which said frame is common, and for the impelling of which, each as required, said frame serves, each of said members having a normal position to which it tends to return when displaced; (c) keys at a keyboard corresponding to said members, a key for each of said members; (d) a motor for actuating the frame aforesaid; and (e) a controlling device for said motor, common to a plurality of the keys aforesaid; each of said keys acting when depressed both to connect the corresponding one of the members aforesaid with the frame aforesaid, and to operate the controlling device aforesaid to bring the motor aforesaid into action; said motor thereupon acting after a key has been depressed and while said key is at rest in its depressed position, to give movement to the frame aforesaid and the key-corresponding member connected therewith by the action of the key depressed, moving said member from its normal position to the limit of its movement.

60. In a keyboard mechanism and in combination, (a) a reciprocating frame normally at rest; (b) an electromagnet for actuating said frame; (c) a key; (d) a member corresponding to said key; said member being normally disconnected from the frame aforesaid and having a normal position to which it tends to return when displaced; said key acting when depressed to cause said member to be connected with said frame; and (e) means operated by said key for controlling the circuit of the magnet aforesaid; said magnet acting when said key has been depressed and is at rest in its depressed position, to actuate the frame aforesaid and the key-corresponding member connected with said frame by the depressing of the key aforesaid, moving said key-corresponding member from its normal position to the limit of its movement.

61. In combination, (a) a reciprocating frame normally at rest; (b) members, to which said frame is common and for the impelling of which, each as required, said frame serves; (c) keys at a keyboard, corresponding to said members, a key for each of said members; (d) an electromagnet for actuating the frame aforesaid; each of the keys aforesaid acting when depressed both to connect the corresponding one of the members aforesaid with said frame, and to bring the magnet into action to impel said frame and the member connected with said frame by the action of the key depressed.

62. In combination, (a) a reciprocating frame normally at rest; (b) members, to which said frame is common and for the impelling of which, each as required, said frame serves, each of said members having a normal position to which it tends to return when displaced; (c) keys at a keyboard, corresponding to said members, a key for each of said members; (d) an electromagnet for actuating the frame aforesaid; and (e) a circuit-controlling device for said magnet, said circuit-controlling device being common to a plurality of the keys aforesaid; each of said keys acting when depressed, both to connect the corresponding one of the members aforesaid with the frame aforesaid and to operate the circuit-controlling device aforesaid to bring the magnet aforesaid into action; whereby the member corresponding to the key depressed and connected by the action of said key with the frame aforesaid, is moved from its normal position to the limit of its movement by the power of the magnet aforesaid.

63. In combination, (a) a key at a keyboard; (b) a member corresponding to said key; (c) a frame for giving movement to said key-corresponding member; said frame being normally inactive and having a normal position to which it tends to return, when displaced; (d) a motor for actuating said frame; the key operating when depressed, both to connect the key-corresponding member aforesaid with the frame aforesaid and to cause the motor to actuate said frame, thereby to actuate said key-corresponding member; and (e) means acting, when said key is depressed and the frame aforesaid actuated by the motor aforesaid, to permit said frame to return toward its normal position in advance of the release of said key.

64. In combination, (a) a key at a keyboard; (b) a member corresponding to said key; (c) a frame for giving movement to said key-corresponding member; said frame being normally inactive and having a normal position to which it tends to return, when displaced; (d) a motor for actuating said frame; the key operating when depressed, both to connect the key-corresponding member aforesaid with the frame aforesaid and to cause the motor to actuate said frame, thereby to actuate said key-corresponding member; and (e) means acting when said key is depressed and the frame aforesaid actuated by the motor aforesaid, to disconnect the key-corresponding member operated by said key from the frame aforesaid in advance of the release of said key.

65. In combination, (a) a key at a keyboard; (b) a member corresponding to said key; (c) a frame for giving movement to said key-corresponding member; said frame being normally inactive and having a normal position to which it tends to return, when displaced; (d) a motor for actuating said frame; the key aforesaid operating when depressed, both to connect the key-corresponding member aforesaid with the frame and to cause the motor aforesaid to actuate said frame, thereby to actuate the key-corresponding member aforesaid; and (e) means operated by said motor, acting when the key aforesaid is depressed, to permit the frame to return toward its normal position in advance of the release of said key.

66. In combination, (a) a key at a keyboard; (b) a member corresponding to said key, said key-corresponding member being normally at rest and having a normal position to which it tends to return when displaced; (c) a frame for giving movement to said key-corresponding member; said frame being normally inactive and having a normal position to which it tends to return, when displaced; (d) a motor for actuating said frame; the key operating when depressed, both to connect the key-corresponding member aforesaid with the frame aforesaid and to cause the motor aforesaid to actuate said frame, thereby to actuate the key-corresponding member aforesaid; and (e) means operated by said motor, acting when the key is depressed, to permit the frame to return toward its normal position in advance of the release of said key, and also to disconnect the key-corresponding member operated by the key depressed from said frame, thereby to permit said key-corresponding member to return toward its normal position in advance of the release of its key.

67. In combination, (a) a key at a keyboard; (b) a member corresponding to said key; (c) a frame for giving movement to said key-corresponding member; said frame being normally inactive and having a normal position to which it tends to return, when displaced; (d) a motor for actuating said frame; (e) a controlling device for said motor, said controlling device having a normal position to which it tends to return when displaced; (f) a jack intermediate the key aforesaid and said motor-controlling device, wherethrough said key when depressed, acts upon said motor-controlling device to bring the motor aforesaid into action to give movement to the frame aforesaid; said motor thereupon acting upon the jack aforesaid to permit the motor-controlling device aforesaid to return toward its normal position in advance of the release of said key; said motor-controlling device operating by such return movement to permit the frame aforesaid to return toward its normal position in advance of the release of the key.

68. In combination, (a) a key at a keyboard; (b) a member corresponding to said key; (c) a frame for giving movement to said key-corresponding member; said frame being normally inactive and having a normal position to which it tends to return, when displaced; (d) an electromagnet for actuating said frame; the key operating when depressed, both to connect the corresponding member aforesaid with the frame and to cause the electromagnet aforesaid to actuate said frame, thereby to actuate the key-corresponding member aforesaid; and (e) means acting, when said key is depressed and the frame aforesaid actuated by the electromagnet, to permit said frame to return toward its normal position in advance of the release of said key.

69. In combination, (a) a key at a keyboard; (b) a member corresponding to said key; (c) a frame for giving movement to said key-corresponding member; said frame being normally inactive and having a normal position to which it tends to return, when displaced; (d) an electromagnet for actuating said frame; the key operating when depressed, both to connect said key-corresponding member with the frame and to cause the electromagnet to actuate said frame, thereby to actuate the key-corresponding member; and (e) means acting when said key is depressed and the frame actuated by the electromagnet, to disconnect said key-corresponding member from said frame, and to permit said frame to return toward its normal position in advance of the release of said key.

70. In combination, (a) a key at a keyboard; (b) a member corresponding to said key; (c) a frame for giving movement to said key-corresponding member; said frame being normally at rest and having a normal position to which it tends to return, when displaced; (d) an electromagnet for actuating said frame; (e) circuit-controlling means operated by said key and acting when said key is depressed to bring the magnet aforesaid into action to operate the frame aforesaid; and (f) means acting when said key is depressed and said magnet thus brought into action, to cut off current from said magnet, thereby to permit the frame aforesaid to return toward its normal position in advance of the release of the key depressed.

71. In combination, (a) a key at a keyboard; (b) a member corresponding to said key; (c) a frame for giving movement to said key-corresponding member; said frame being normally at rest; (d) an electromagnet for actuating said frame; (e) a device controlling the circuit of the magnet aforesaid; (f) a mechanical connection intermediate the key and the circuit-controlling device aforesaid; and (g) means acting when said key is depressed, to trip said connection in advance of the release of said key.

72. In combination, (a) a key at a keyboard; (b) a member corresponding to said key; (c) a frame for giving movement to said key-corresponding member; said frame being normally at rest and having a normal position to which it tends to return, when displaced; (d) an electromagnet for actuating said frame; (e) a device controlling the circuit of said magnet, said circuit-controlling device having a normal position to which it tends to return when displaced; (f) a jack intermediate said key and said circuit-controlling device, wherethrough said key when it is depressed acts upon said circuit-controlling device to bring the magnet aforesaid into action, so that the said magnet gives movement to the frame aforesaid; said magnet thereupon acting upon said jack to permit the circuit-controlling device to return toward its normal position in advance of the release of the key depressed; said circuit-controlling device operating by such return movement to render the magnet aforesaid inactive so as to permit the frame aforesaid to return toward its normal position in advance of the release of the key depressed.

73. In combination, (a) a plurality of keys at a keyboard; (b) members corresponding to said keys, a member for each key; (c) a frame for giving movement to said key-corresponding members, each as required; said frame being normally at rest and having a normal position to which it tends to return, when displaced; (d) a motor for actuating said frame; the keys aforesaid each operating when it is depressed both to connect that one of the members aforesaid corresponding to said key with the frame aforesaid, and to cause the motor to actuate said frame, thereby to actuate the key-corresponding member thus connected with it; and (e) means acting when a key is depressed and the frame aforesaid actuated by the motor aforesaid, to permit said frame to return toward its normal position in advance of the release of said key.

74. In combination, (a) a plurality of keys at a keyboard; (b) members corresponding to said keys a member for each key; (c) a frame for giving movement to said key-corresponding members, each as required; said frame being normally at rest; (d) a motor for actuating said frame; the keys aforesaid each operating when it is depressed both to connect that one of the members aforesaid corresponding to said key with the frame aforesaid, and to cause the motor to actuate said frame, thereby to actuate the key-corresponding member thus connected with it; and (e) means acting when a key is depressed to disconnect said key-corresponding member from said frame in advance of the release of the key depressed.

75. In combination, (a) a plurality of keys at a keyboard; (b) members corresponding to said keys, a member for each key; (c) a frame for giving movement to said key-corresponding members, each as required; said frame being normally at rest and having a normal position to which it tends to return, when displaced; (d) a motor for actuating said frame; the keys each operating when it is depressed both to connect that one of the members aforesaid corresponding to said key with the frame aforesaid, and to cause the motor to actuate said frame, thereby to actuate the key-corresponding member thus connected with it; and (e) means acting when a key is depressed to disconnect the member corresponding to the key depressed, from the frame aforesaid, and to permit said frame to return toward its normal position in advance of the release of the key depressed.

76. In combination, (a) a plurality of keys at a keyboard; (b) members corresponding to said keys a member for each key; (c) a frame for giving movement to said key-corresponding members, each as required; said frame being normally at rest; (d) a motor for actuating said frame; (e) a controlling device for said motor, common to a plurality of the keys aforesaid; (f) jacks intermediate said keys and said motor-controlling device, wherethrough said keys when depressed act upon said motor-controlling device to bring the motor into action to operate the frame aforesaid and the key-corresponding member connected therewith by the key depressed; and (g) means acting when a key is depressed to free the jack operated by said key.

77. In combination, (a) a plurality of keys at a keyboard; (b) members corresponding to said keys, a member for each key; (c) a frame for giving movement to said key-corresponding members, each as required; said frame being normally at rest; (d) a motor for actuating said frame; (e) a controlling device for said motor, common to a plurality of the keys aforesaid; (f) jacks intermediate said keys and said motor-controlling device, wherethrough said keys when depressed act upon said motor-controlling device to bring the motor into action to operate the frame aforesaid and the key-corresponding member connected therewith by the key depressed; and (g) means operated by the motor aforesaid, acting when a key is depressed, to free the jack operated by said key, in advance of the release of said key.

78. In combination, (a) a plurality of keys at a keyboard; (b) members corresponding to said keys, a member for each key; (c) a frame for giving movement to said key-corresponding members, each as required; said frame being normally at rest and having a normal position to which it tends to return, when displaced; (d) an electromagnet for actuating said frame; the keys aforesaid each operating when it is depressed, both to connect that one of the members aforesaid corresponding to said key with the frame aforesaid, and to cause the electromagnet to actuate said frame, thereby to actuate the key-corresponding member thus connected with it; and (e) means acting when a key is depressed and the frame aforesaid actuated by the electromagnet aforesaid, to permit said frame to return toward its normal position in advance of the release of said key.

79. In combination, (a) a plurality of keys at a keyboard; (b) members corresponding to said keys a member for each key; (c) a frame for giving movement to said key-corresponding members, each as required; said frame being normally at rest and having a normal position to which it tends to return, when displaced; (*d*) an electromagnet for actuating said frame; the keys aforesaid each operating when it is depressed, both to connect that one of the members aforesaid corresponding to said key with the frame aforesaid, and to cause the electromagnet to actuate said frame, thereby to actuate the key-corresponding member thus connected with it; and (*e*) means acting when a key is depressed and the frame aforesaid moved by the electromagnet aforesaid, to disconnect the key-corresponding member corresponding to the key depressed, from said frame, and to permit said frame to return toward its normal position in advance of the release of the key depressed.

80. In combination, (*a*) a plurality of keys at a keyboard; (*b*) members corresponding to said keys, a member for each key; (*c*) a frame for giving movement to said key-corresponding members, each as required; said frame being normally at rest; (*d*) an electromagnet for actuating said frame; (*e*) a device controlling the circuit of said magnet; said device being common to a plurality of the keys aforesaid; (*f*) jacks corresponding to said keys, a jack for each key, wherethrough said key when depressed, acts to give movement to that one of the members aforesaid that corresponds to said key, to cause said key-corresponding member to be connected with the frame aforesaid, and wherethrough said key acts upon the circuit-controlling device aforesaid to bring the magnet into action to operate the frame aforesaid and the key-corresponding member connected therewith; and (*g*) means acting when a key is depressed, to free the jack operated by said key.

81. In combination, (*a*) a plurality of keys at a keyboard; (*b*) members corresponding to said keys, a member for each key; (*c*) a frame for giving movement to said key-corresponding members, each as required; said frame being normally at rest; (*d*) an electromagnet for actuating said frame; (*e*) a device controlling the circuit of said magnet; said device being common to a plurality of the keys aforesaid; (*f*) jacks corresponding to said keys, a jack for each key, wherethrough said key when depressed, acts to give movement to that one of the members aforesaid that corresponds to said key, to cause said key-corresponding member to be connected with the frame aforesaid, and wherethrough said key acts upon the circuit-controlling device aforesaid to bring the magnet aforesaid into action to operate the frame aforesaid and the key-corresponding member connected therewith; and (*g*) means operated by the electromagnet aforesaid acting when a key is depressed, to free the jack operated by said key in advance of the release of said key.

82. In combination, (*a*) a reciprocating frame, normally at rest; (*b*) a movement-receiving member which said frame serves to actuate; said movement-receiving member being normally disconnected from said frame; (*c*) a lever to which said movement-receiving member is pivoted, and whereby it is mounted to be moved into operative relation with the frame aforesaid; (*d*) a key, controlling said lever; and (*e*) motor mechanism acting when said key is depressed, to operate said frame.

83. In combination, (*a*) a reciprocating frame, normally at rest; (*b*) a movement-receiving member which said frame serves to actuate; said movement-receiving member being normally disconnected from said frame; (*c*) a lever to which said movement-receiving member is pivoted and whereby it is mounted to be moved into operative relation with the frame aforesaid; (*d*) a key; (*e*) a jack intermediate said key and the lever aforesaid, wherethrough said key when it is depressed, gives movement to said lever and the movement-receiving member pivoted thereto, to bring said movement-receiving member into operative relation with the frame aforesaid; and (*f*) motor mechanism acting when said key is depressed, to operate said frame.

84. In combination, (*a*) a reciprocating frame, normally at rest; (*b*) a movement-receiving member which said frame serves to actuate; said movement-receiving member being normally disconnected from said frame; (*c*) a lever to which said movement-receiving member is pivoted and whereby it is mounted to be moved into operative relation with said frame; (*d*) a key; (*e*) a jack intermediate said key and the lever aforesaid, wherethrough said key when it is depressed, gives movement to said lever and the movement-receiving member pivoted thereto to bring said movement-receiving member into operative relation with the frame aforesaid; and (*f*) means acting when said key is depressed, to operate the frame and to free the jack aforesaid.

85. In combination, (*a*) a reciprocating frame, normally at rest; (*b*) a movement-receiving member which said frame serves to actuate; said movement-receiving member being normally disconnected from said frame; (*c*) a lever to which said movement-receiving member is pivoted and whereby it is mounted to be moved into operative relation with said frame; (*d*) a key; (*e*) a jack intermediate said key and the lever aforesaid, wherethrough said key when it is depressed, gives movement to said lever and the movement-receiving member pivoted thereto to bring said movement-receiving member into operative relation with said frame; and (*f*) a motor device serving, when said key is depressed, both to operate the frame aforesaid and also to free the jack aforesaid.

86. In combination in a keyboard mechanism, (*a*) a reciprocating frame, normally at rest; (*b*) movement-receiving members for the actuating of which, each as required, said frame serves; and (*c*) levers to which said movement-receiving members are pivoted and whereby they are mounted to be moved into operative relation with the frame aforesaid.

87. In combination in a keyboard mechanism, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; and (d) a motor for operating said frame.

88. In combination in a keyboard mechanism, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) a motor for operating said frame; and (e) a controlling device for said motor common to and operated by a plurality of the levers aforesaid.

89. In combination in a keyboard mechanism, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) jacks acting on said levers; and (e) means for freeing said jacks.

90. In combination in a keyboard mechanism, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) jacks acting on said levers; (e) a motor for actuating the frame aforesaid; (f) means for controlling said motor, operated through the jacks aforesaid; and (g) means for freeing said jacks, each as required.

91. In combination in a keyboard mechanism, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) jacks acting on said levers; (e) a motor for actuating the frame aforesaid; (f) means for controlling said motor, operated through the jacks aforesaid; and (g) a frame common to a plurality of said jacks; said frame being actuated by the motor aforesaid and acting to free said jacks each as required.

92. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; and (d) keys controlling said levers.

93. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) keys controlling said levers; and (e) a motor device controlled by said keys, and acting when a key is depressed, to give movement to the frame aforesaid.

94. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) keys controlling said levers; (e) a motor device connected with the frame aforesaid; and (f) a controlling device for said motor, common to a plurality of the keys aforesaid and acting when any of said keys is depressed to bring said motor into action to operate the frame aforesaid.

95. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) keys corresponding to said levers; and (e) jacks intermediate said keys and said levers wherethrough said keys operate said levers.

96. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) keys corresponding to said levers; (e) jacks intermediate said keys and said levers wherethrough said keys operate said levers; (f) a motor for actuating the frame aforesaid; (g) controlling means for said motor operated by said keys through said jacks; and (h) means for freeing said jacks, each as required.

97. In combination, (a) a reciprocating frame, normally at rest; (b) movement-receiving members for the actuating of which, each as required, said frame serves; (c) levers to which said movement-receiving members are pivoted and whereby they are mounted to be moved into operative relation with the frame aforesaid; (d) keys corresponding to said levers; (e) jacks intermediate said keys and said levers wherethrough said keys operate said levers; (f) a motor for actuating the frame aforesaid; and (g) a releasing-frame common to a plurality of the jacks aforesaid; said frame being operated by the motor aforesaid and acting to free said jacks, each as required.

98. In combination in a keyboard mechanism, (a) a frame mounted to reciprocate in two arcs or paths, but normally at rest; (b) a motor for actuating said frame; and (c) a controlling device for said motor the movement of said frame in one arc or path bringing the motor aforesaid into action to move said frame in another arc or path.

99. In combination in a keyboard mechanism, (a) a frame mounted to reciprocate in two arcs or paths, but normally at rest; (b) an electromagnet for actuating said frame; (c) circuit-controlling means operated by said frame, the movement of said frame in one arc or path bringing the magnet aforesaid into action to move it in another arc or path.

100. In combination in a keyboard mechanism, (a) a frame mounted to reciprocate in two arcs or paths, but normally at rest; (b) a motor for actuating said frame; (c) a lever to which said frame is pivoted and whereby it is mounted; and (d) means operated by said lever for controlling the motor aforesaid; the movement of said frame in one arc or path bringing said motor into action to move it in another arc or path.

101. In combination in a keyboard mechanism, (a) a reciprocating frame, normally at rest; (b) a motor for actuating said frame; (c) a controlling device for said motor to which said frame is connected; (d) a key; and (e) a member operated by said key and acting when said key is depressed, to press upon said frame, and through said frame to act upon the motor-controlling device aforesaid to bring the motor aforesaid into action to operate said frame, so that said frame in turn gives movement to the member pressed against it by the key depressed.

102. In combination in a keyboard mechanism, (a) a reciprocating frame normally at rest; (b) a motor for actuating said frame; (c) a controlling device for said motor to which said frame is connected; (d) a key; (e) a member operated by said key and acting when said key is depressed, to press upon said frame, and through said frame to act upon the motor-controlling device aforesaid to bring the motor aforesaid into action to operate said frame, so that said frame in turn gives movement to the member pressed against it by the key depressed; and (f) means acting to release said frame in advance of the release of the key depressed.

103. In combination in a keyboard mechanism, (a) a reciprocating frame normally at rest; (b) a motor for actuating said frame; (c) a controlling device for said motor to which said frame is connected; (d) a key; (e) a member operated by said key and acting when said key is depressed, to press upon said frame, and through said frame to act upon the motor-controlling device aforesaid to bring the motor aforesaid into action to operate said frame, so that said frame in turn gives movement to the member pressed against it by the key depressed; and (f) means acting to release the member pressed by the action of said key against said frame, from said frame, in advance of the release of said key.

104. In combination in a keyboard mechanism, (a) a reciprocating frame normally at rest; (b) a motor for actuating said frame; (c) a controlling device for said motor to which said frame is connected; (d) a key; (e) a movement-receiving member corresponding to said key; (f) a lever whereto said movement-receiving member is pivoted and whereby it is mounted to move to and from the frame aforesaid; (g) a jack intermediate said lever and the key aforesaid, wherethrough said key when it is depressed, acts upon said lever to press the movement-receiving member aforesaid against the frame aforesaid, thereby operating the motor-controlling device aforesaid so that the motor aforesaid gives movement to said frame and to the movement-receiving member corresponding to the key depressed; and (h) means for freeing said jack in advance of the release of the key.

105. In combination in a keyboard mechanism, (a) a reciprocating frame normally at rest; (b) a motor for actuating said frame; (c) a controlling device for said motor to which said frame is connected; (d) a key; (e) a movement-receiving member corresponding to said key; (f) a lever whereto said movement-receiving member is pivoted and whereby it is mounted to move to and from the frame aforesaid; (g) a jack intermediate said lever and the key aforesaid, wherethrough said key when it is depressed, acts upon said lever to press the movement-receiving member aforesaid against the frame aforesaid so that the motor aforesaid gives movement to said frame and to the movement-receiving member corresponding to the key depressed, said motor thereupon acting to free said jack.

106. In combination in a keyboard mechanism, (a) a reciprocating frame, normally at rest; (b) an electromagnet for actuating said frame; (c) a circuit-controlling device for said magnet, to which circuit-controlling device the frame aforesaid is mechanically connected; (d) a key; and (e) a member operated by said key and acting when said key is depressed to press upon the frame aforesaid, and through said frame to act upon the circuit-controlling device aforesaid to bring the magnet aforesaid into action to operate said frame so that said frame in turn gives movement to the member pressed against it by the key depressed.

107. In combination in a keyboard mechanism, (a) a reciprocating frame normally at rest; (b) an electromagnet for actuating said frame; (c) a circuit-controlling device for said magnet to which circuit-controlling device the frame aforesaid is mechanically connected; (*d*) a key; (*e*) a member operated by said key and acting when said key is depressed to press upon the frame aforesaid, and through said frame to act upon the circuit-controlling device aforesaid to bring the magnet aforesaid into action to operate said frame so that said frame in turn gives movement to the member pressed against it by the key depressed; and (*f*) means acting to release said frame in advance of the release of the key depressed.

108. In combination in a keyboard mechanism, (*a*) a reciprocating frame, normally at rest; (*b*) an electromagnet for actuating said frame; (*c*) a circuit-controlling device for said magnet, to which circuit-controlling device the frame aforesaid is mechanically connected; (*d*) a key; (*e*) a member operated by said key and acting when said key is depressed to press upon the frame aforesaid, and through said frame to act upon the circuit-controlling device aforesaid to bring the magnet aforesaid into action to operate said frame so that said frame in turn gives movement to the member pressed against it by the key depressed; and (*f*) means acting to release the member pressed by the action of the key against said frame, from said frame, in advance of the release of the key depressed.

109. In combination in a keyboard mechanism, (*a*) a reciprocating frame, normally at rest; (*b*) an electromagnet for actuating said frame; (*c*) a circuit-controlling device for said magnet, to which circuit-controlling device the frame aforesaid is mechanically connected; (*d*) a key; (*e*) a movement-receiving member corresponding to said key; (*f*) a lever whereto said movement-receiving member is pivoted and whereby it is mounted to move to and from the frame aforesaid; (*g*) a jack intermediate said lever and the key aforesaid, wherethrough said key when it is depressed, acts upon said lever to press the movement-receiving member aforesaid against the frame aforesaid, so that the magnet aforesaid gives movement to said frame and to the movement-receiving member corresponding to the key depressed; and (*h*) means for freeing the latch aforesaid in advance of the release of the key.

110. In combination in a keyboard mechanism, (*a*) a reciprocating frame normally at rest; (*b*) a motor for actuating said frame; (*c*) a controlling device for said motor, to which said frame is connected; (*d*) a plurality of keys to which said frame is common; (*e*) members operated by said keys, a member for each key, acting when said key is depressed to press upon said frame and through said frame to act upon the motor-controlling device aforesaid to bring the motor aforesaid into action to operate said frame, so that said frame gives movement to the member pressed against it by the key depressed.

111. In combination in a keyboard mechanism, (*a*) a reciprocating frame normally at rest; (*b*) a motor for actuating said frame; (*c*) a controlling device for said motor, to which said frame is connected; (*d*) a plurality of keys to which said frame is common; (*e*) members operated by said keys, a member for each key, acting when said key is depressed to press upon said frame, and through said frame to act upon the motor-controlling device aforesaid to bring the motor aforesaid into action to operate said frame, so that said frame gives movement to the member pressed against it by the key depressed; and (*f*) means acting to release the member pressed (by the action of the key depressed) against said frame, from said frame, in advance of the release of the key depressed.

112. In combination in a keyboard mechanism, (*a*) a reciprocating frame normally at rest; (*b*) a motor for actuating said frame; (*c*) a controlling device for said motor, to which said frame is connected; (*d*) a plurality of keys to which said frame is common; (*e*) movement-receiving members corresponding to said keys, a movement-receiving member for each key; (*f*) levers whereto said movement-receiving members are pivoted and whereby they are mounted to move to and from the frame aforesaid; (*g*) jacks intermediate said levers and the keys aforesaid, a jack for each key, wherethrough said key when it is depressed acts upon the lever corresponding to said key to press the movement-receiving member pivoted to said lever against the frame aforesaid, thereby operating the motor-controlling device aforesaid so that the motor gives movement to the frame and to the movement-receiving member corresponding to the key depressed; and (*h*) means for freeing the jack corresponding to the key depressed in advance of the release of said key.

113. In combination in a keyboard mechanism, (*a*) a reciprocating frame, normally at rest; (*b*) an electromagnet for actuating said frame; (*c*) a circuit-controlling device for said magnet, to which circuit-controlling device said frame is mechanically connected; (*d*) a plurality of keys to which said frame is common; (*e*) members operated by said keys, a member for each key, each member acting when the key to which it corresponds is depressed, to press upon the frame aforesaid and through said frame to act upon the circuit-controlling device aforesaid to bring the electromagnet aforesaid into action to operate said frame, so that said frame gives movement to the member pressed against it by the key depressed.

114. In combination in a keyboard mechanism, (*a*) a reciprocating frame, normally at rest; (*b*) an electromagnet for actuating said frame; (*c*) a circuit-controlling device for said magnet, to which circuit-controlling device said frame is mechanically connected; (*d*) a plurality of keys to which said frame is common; (*e*) members operated by said keys, a member for each key, each member acting when the key to which it corresponds is depressed, to press upon the frame aforesaid and through said frame to act upon the circuit-controlling device aforesaid to bring the electromagnet aforesaid into action to operate said frame, so that said frame gives movement to the member pressed against it by the key depressed; and (*f*) means acting to release the member pressed (by the action of the key depressed) against said frame, from said frame, in advance of the release of the key depressed.

115. In combination in a keyboard mechanism, (*a*) a reciprocating frame, normally at rest; (*b*) an electromagnet for actuating said frame; (*c*) a circuit-controlling device for said magnet, to which circuit-controlling device the frame aforesaid is mechanically connected; (*d*) a plurality of keys to which said frame is common; (*e*) movement-receiving members corresponding to said keys, a movement-receiving member for each key; (*f*) levers whereto said movement-receiving members are pivoted and whereby they are mounted to move to and from the frame aforesaid; (*g*) jacks intermediate said levers and the keys aforesaid, a jack for each key, wherethrough said key, when it is depressed, acts upon the corresponding lever to press the movement-receiving member pivoted to said lever against the frame aforesaid, thereby operating the circuit-controlling device aforesaid, so that the electromagnet gives movement to the frame aforesaid and to the movement-receiving member corresponding to the key depressed; and (*h*) means for freeing the jack corresponding to the key depressed in advance of the release of said key.

116. In a pianoforte-action and in combination, a key; a hammer; a reciprocator, normally at rest; means controlled by the key aforesaid acting, upon the depressing of said key, to connect the hammer aforesaid with the reciprocator aforesaid; said reciprocator acting to impel said hammer.

117. In a pianoforte-action and in combination, a plurality of keys; hammers corresponding respectively with said keys; a reciprocator normally at rest; the keys aforesaid each acting when depressed to connect the hammer corresponding to it with the reciprocator aforesaid; said reciprocator acting to impel said hammer.

118. In a pianoforte-action and in combination, a key; a hammer; a motor, normally at rest, the key aforesaid acting when depressed to connect the hammer aforesaid with the motor aforesaid; and motor-controlling means, operated by the key aforesaid, and acting when said key is depressed, to bring the motor aforesaid into action to impel the hammer connected with it.

119. In a pianoforte-action and in combination, a plurality of keys, hammers corresponding with said keys; a motor, normally at rest, operating to impel all the hammers aforesaid, each as required; means, acting on the depressing of a key, to connect the hammer corresponding to such key with the motor aforesaid; and means operated by the keys aforesaid and acting when any of said keys is depressed, to bring the motor aforesaid into action for the impelling of the hammer connected with it.

120. In a pianoforte-action and in combination, a reciprocator, normally at rest; a hammer; a key acting, when depressed to connect said hammer with the reciprocator aforesaid; a motor, acting to impel said reciprocator; and means acting when said key is depressed to bring the motor aforesaid into action to impel the reciprocator aforesaid and the hammer connected with it.

121. In a pianoforte-action and in combination, a reciprocator, normally at rest; a plurality of hammers; keys, corresponding to said hammers; said keys acting each, when depressed, to connect the hammer corresponding to it with the reciprocator aforesaid; and means acting when any of the keys aforesaid is depressed, to impel the reciprocator aforesaid and the hammer connected therewith.

122. In a pianoforte-action and in combination, a reciprocator, mounted to move in two different arcs or paths and being normally at rest; a motor, acting to impel said reciprocator; a hammer; a key, acting when depressed, to connect said hammer with said reciprocator, and to move said reciprocator in one of the arcs or paths above mentioned; and a motor-controlling device, controlled by the movement last mentioned of the reciprocator aforesaid and acting to bring the motor aforesaid into action to impel said reciprocator in the other one of the two arcs or paths before mentioned, thereby to impel the hammer aforesaid, connected with said reciprocator.

123. In a pianoforte-action and in combination, a reciprocator mounted to move in two different arcs or paths, and being normally at rest; a motor acting to impel said reciprocator; a plurality of hammers; keys corresponding to said hammers, said keys each acting, when depressed, to connect the hammer corresponding to said key with the reciprocator aforesaid, and to move said reciprocator in one of the two arcs or paths before mentioned, in which said reciprocator is mounted to move; and a motor-controlling device, controlled by the movement last mentioned, of the reciprocator aforesaid, and acting to bring the motor aforesaid into action to impel said reciprocator in the other one of the two arcs or paths before mentioned, thereby to impel the hammer connected with said reciprocator by the key depressed.

124. In a pianoforte-action and in combination, a reciprocator, normally at rest; an electric motor, acting to impel said reciprocator; a hammer, normally disconnected from said motor; a key, acting when depressed, to connect said hammer with said reciprocator to receive movement therefrom; and circuit-controlling means, controlled by the key aforesaid and acting, when said key is depressed, to bring the electric motor aforesaid into action for the impelling of the reciprocator aforesaid and the hammer connected therewith.

125. In a pianoforte-action and in combination, a reciprocator normally at rest; an electric motor, acting to impel said reciprocator; a plurality of hammers, normally disconnected from the motor aforesaid; keys, corresponding to said hammers, each key acting, when depressed, to connect the hammer corresponding to it with the reciprocator aforesaid; and circuit-controlling means, controlled by the keys aforesaid and acting, when any of said keys is depressed, to bring the electric motor aforesaid into action, to impel the reciprocator aforesaid and the hammer connected therewith.

126. In a pianoforte-action and in combination, a reciprocator, mounted to move in two different arcs or paths and being normally at rest; an electric motor, acting to impel said reciprocator; a hammer; a key, acting when depressed to connect said hammer with said reciprocator and to move said reciprocator in one of the two arcs or paths before mentioned; circuit-controlling means, operated by the movement last mentioned, of the reciprocator aforesaid, and acting to bring the motor aforesaid into action for the impelling of the reciprocator aforesaid, and the hammer connected therewith.

127. In a pianoforte-action and in combination, a reciprocator mounted to move in two different arcs or paths and being normally at rest; an electric motor, acting to impel said reciprocator; a plurality of hammers; keys, corresponding to said hammers, each key acting, when depressed, to connect the hammer corresponding to it with the reciprocator aforesaid, and to move said reciprocator in one of the two arcs or paths before mentioned; circuit-controlling means, operated by the movement last mentioned, of the reciprocator aforesaid, and acting to bring the motor aforesaid into action for the impelling of said reciprocator and the hammers connected therewith.

128. In a pianoforte-action and in combination, a reciprocator normally at rest; a hammer normally disconnected from said reciprocator; a key, acting when depressed, to connect said hammer with said reciprocator; means whereby said reciprocator is impelled when the key is depressed; and means acting to disconnect the hammer aforesaid from the reciprocator aforesaid in advance of the release of the key.

129. In a pianoforte-action and in combination, a reciprocator normally at rest; a hammer normally disconnected from said reciprocator; a key, acting when depressed, to connect said hammer with said reciprocator; means whereby said reciprocator is impelled when the key is depressed; and means acting to permit the reciprocator aforesaid to return to its normal position in advance of the release of the key.

130. In a pianoforte-action and in combination, a reciprocator normally at rest; a hammer normally disconnected from said reciprocator; a key, acting when depressed, to connect said hammer with said reciprocator; means whereby said reciprocator is impelled when the key is depressed; means acting to disconnect the hammer aforesaid from the reciprocator aforesaid and to permit the reciprocator aforesaid to return to its normal position in advance of the release of the key; and a check, whereby the hammer is arrested on rebounding from the string.

131. In a pianoforte-action and in combination, a reciprocator normally at rest; a hammer normally disconnected from said reciprocator; a key, acting when depressed, to connect said hammer with said reciprocator; motor mechanism, acting when the key is depressed to impel said reciprocator; and means acting to disconnect the hammer aforesaid from the reciprocator aforesaid in advance of the release of the key.

132. In a pianoforte-action and in combination, a reciprocator normally at rest; a hammer normally disconnected from said reciprocator; a key, acting when depressed, to connect said hammer with said reciprocator; motor mechanism acting when the key is depressed to impel said reciprocator; means acting both to disconnect the hammer aforesaid from the reciprocator aforesaid, and to permit said reciprocator to return to its normal position in advance of the release of the key; and a check for the hammer.

133. In a pianoforte-action and in combination, a reciprocator normally at rest; a hammer, normally disconnected from said reciprocator; a key, acting when depressed, to connect said hammer with said reciprocator; motor mechanism, acting to impel said reciprocator; means controlled by the key aforesaid, acting when said key is depressed, to bring the motor aforesaid into action for the impelling of the reciprocator aforesaid and the hammer connected therewith; and means acting to disconnect the hammer aforesaid from the reciprocator aforesaid in advance of the release of the key.

134. In a pianoforte-action and in combination, a reciprocator normally at rest; a hammer, normally disconnected from said reciprocator; a key, acting when depressed, to connect said hammer with said reciprocator; an electric motor acting to impel said reciprocator; means controlled by the key aforesaid, acting when said key is depressed, to bring the motor aforesaid into action for the impelling of the reciprocator aforesaid and the hammer connected therewith; means acting to disconnect the hammer aforesaid from the reciprocator aforesaid, and to permit said reciprocator to return to its normal position in advance of the release of the key; and a check, whereby the hammer aforesaid is arrested on rebounding from the string.

135. In a keyboard instrument and in combination, a reciprocator normally at rest; a motor acting to impel said reciprocator; a plurality of keys; members corresponding respectively to said keys, each key acting when depressed, to connect the member corresponding to it with the reciprocator aforesaid; a motor-controlling device, operated by the keys aforesaid and acting when any key is depressed to bring the motor aforesaid into action for the impelling of the reciprocator aforesaid, and the member connected therewith by the key depressed; and means acting to disconnect the members aforesaid from the reciprocator aforesaid and to permit said reciprocator to return to its normal position in advance of the release of the key; and means whereby each of the members aforesaid is prevented from returning to its normal position, so long as the key controlling is held down.

136. An action for a keyboard instrument, including in combination, an oscillating friction-driver, normally at rest; a contact-piece; and a key, acting when depressed to press said contact-piece against said friction-driver.

137. An action for a keyboard instrument, including in combination, a reciprocating friction-driver, normally at rest; a contact-piece; and a key, acting, when depressed to press said contact-piece against said friction-driver to receive motion therefrom; and a motor, acting to impel said friction-driver, when the key is depressed.

138. An action for a keyboard instrument, including in combination, a reciprocating friction-driver, normally at rest; said reciprocating friction-driver being mounted to move in two different arcs or paths; motor mechanism acting to impel said reciprocating friction-driver; a contact-piece; a key, acting when depressed, to press said contact-piece against said friction-driver to establish a frictional connection between them; said key, acting also to move the reciprocating friction-driver aforesaid in one of the two arcs or paths before mentioned; means operated by the last-mentioned movement of the reciprocating friction-driver aforesaid, acting to bring the motor aforesaid into action to move the friction-driver aforesaid in the other one of the two arcs or paths in which it is mounted to move.

139. An action for a keyboard instrument, including in combination, a reciprocating friction-driver, normally at rest; a contact-piece; a key, acting, when depressed to press said contact-piece against said friction-driver to establish a frictional connection between them; and means acting to disconnect the contact-piece aforesaid from the friction-driver aforesaid in advance of the release of the key.

140. An action for a keyboard instrument, including in combination, a reciprocating friction-driver, normally at rest; a contact-piece; a key, acting, when depressed, to press said contact-piece against said friction-driver; a motor, acting to impel said friction-driver when the key is depressed; and means acting to disconnect the contact-piece aforesaid from the friction-driver aforesaid in advance of the release of the key.

141. An action for a keyboard instrument, including in combination, a reciprocating friction-driver, normally at rest; said reciprocating friction-driver being mounted to move in two different arcs or paths; motor mechanism acting to impel said reciprocating friction-driver; a contact-piece; a key, acting when depressed, to press said contact-piece against said friction-driver to establish a frictional connection between them; said key, acting also to move the reciprocating friction-driver aforesaid in one of the two arcs or paths before mentioned; means operated by the last-mentioned movement of the reciprocating friction-driver aforesaid, acting to bring the motor aforesaid into action to move the friction-driver aforesaid in the other one of the two arcs or paths in which it is mounted to move; and means acting to disconnect the contact-piece aforesaid from the friction-driver aforesaid in advance of the release of the key.

142. An action for a keyboard instrument, including in combination, a reciprocating friction-driver, normally at rest; a contact-piece; a key, acting, when depressed, to press said contact-piece against said friction-driver; a motor, acting to impel said friction-driver when the key is depressed; means acting to disconnect the contact-piece aforesaid from the friction-driver aforesaid and to permit said friction-driver to return to its normal position in advance of the release of the key, and means whereby the contact-piece aforesaid when moved by the friction-driver aforesaid and disconnected therefrom is prevented from returning to its normal position in advance of the release of the key.

143. In a pianoforte-action and in combination, a reciprocating friction-driver normally at rest; a hammer; a contact-piece connected with said hammer; and a key, acting when depressed, to press the contact-piece aforesaid against the friction-driver aforesaid to establish a frictional connection between them.

144. In a pianoforte-action and in combination, a motor, normally at rest; a hammer, normally disconnected from said motor; a key, and means controlled thereby, acting, when said key is depressed to connect the hammer aforesaid with the motor aforesaid frictionally; and a motor-controlling device, controlled by the key aforesaid and operating when said key is depressed to bring the motor aforesaid into action to impel the hammer aforesaid.

145. In a pianoforte-action and in combination, a reciprocating friction-driver; a hammer; a contact-piece connected with said hammer; a key, acting when depressed, to establish a frictional connection between the contact-piece aforesaid and the friction-driver aforesaid; and motor mechanism controlled by the key aforesaid, and acting on the depressing of said key to impel the friction-driver aforesaid.

146. In a pianoforte-action and in combination, a reciprocator mounted to move in two different arcs or paths, said reciprocator being normally at rest; a motor for actuating said reciprocator; a hammer; a contact-piece, connected with said hammer; a key, acting when depressed, to press the contact-piece aforesaid against the reciprocator aforesaid, thereby connecting said contact-piece frictionally with said reciprocator, and moving said reciprocator in one of the two arcs or paths before mentioned; and means operated by the last-mentioned movement of said reciprocator, and acting to bring the motor aforesaid into action to impel the reciprocator aforesaid in the other one of the arcs or paths in which it is mounted to move, as before mentioned, thereby to impel the contact-piece aforesaid and the hammer connected therewith.

147. In a pianoforte-action and in combination, a hammer; a contact-piece connected with said hammer; a reciprocator acting as a friction-driver to impel the contact-piece aforesaid, and the hammer connected therewith; a key, acting when depressed, to connect the contact-piece aforesaid with the reciprocator aforesaid frictionally; and an electric motor acting on the depressing of the key to impel said reciprocator.

148. In a pianoforte-action and in combination, a hammer; a contact-piece connected with said hammer; a reciprocator acting as a friction-driver to impel said contact-piece and hammer, said reciprocator being normally at rest; a key, acting when depressed, to press the contact-piece aforesaid against the reciprocator aforesaid, to connect them frictionally; and means acting to disconnect said contact-piece and reciprocator while the pressure upon the key is maintained.

149. In a pianoforte-action and in combination, a motor normally at rest; a hammer normally disconnected from said motor; a key and means controlled thereby acting, when said key is depressed to connect the hammer aforesaid frictionally with the motor aforesaid, to receive movement therefrom and to bring said motor into action for the impelling of said hammer; and means acting to disconnect said hammer from said motor while the pressure on said key is maintained.

150. In a pianoforte-action and in combination, a hammer; a contact-piece connected therewith; a reciprocator, acting as a friction-driver to impel the contact-piece and hammer aforesaid, said reciprocator being normally at rest; a key, acting when depressed, to connect the contact-piece aforesaid with the reciprocator aforesaid frictionally; motor mechanism, acting, when said key is depressed, to impel said reciprocator; and means whereby the contact-piece aforesaid is disconnected from the reciprocator aforesaid, while the pressure upon the key aforesaid is maintained.

151. In a pianoforte-action and in combination, a hammer; a contact-piece connected with said hammer; a reciprocator acting as a friction-driver to impel said contact-piece and hammer, said reciprocator being normally at rest; a key, acting when depressed, to press the contact-piece aforesaid against the reciprocator aforesaid; means acting to disconnect said contact-piece and reciprocator while the pressure upon the key is maintained; and a check for the hammer.

152. In a pianoforte-action and in combination, a motor normally at rest; a hammer normally disconnected from said motor; a key and means controlled thereby acting when said key is depressed, to connect the hammer aforesaid frictionally with the motor aforesaid to receive movement therefrom, and to bring the motor aforesaid into action for the impelling of said hammer; means acting to disconnect the hammer aforesaid and the motor aforesaid while the pressure on the key is maintained; and a check for the hammer.

153. In a pianoforte-action and in combination, a hammer; a contact-piece connected therewith; a reciprocator acting as a friction-driver to impel the contact-piece and hammer aforesaid, said reciprocator being normally at rest; a key, acting when depressed, to connect the contact-piece aforesaid with the reciprocator aforesaid frictionally; motor mechanism, acting, when said key is depressed, to impel said reciprocator; means whereby the contact-piece aforesaid is disconnected from the reciprocator aforesaid, while the pressure upon the key aforesaid is maintained; and a check for the hammer.

154. In an action for a keyboard instrument and in combination a reciprocator normally at rest; a motor acting to impel said reciprocator; a motor-controlling device to which said reciprocator is pivoted, said motor-controlling device being actuated by the movement of said reciprocator in one direction and thereupon acting to bring the motor aforesaid into operation to actuate said reciprocator in another direction.

155. In a pianoforte-action and in combination, a hammer; a contact-piece connected therewith; a reciprocator acting as a friction-driver to impel said contact-piece and hammer, said reciprocator being normally at rest; a motor acting to impel said reciprocator; a motor-controlling device, to which said reciprocator is pivoted, said motor-controlling device being actuated by the movement in one direction of said reciprocator when the contact-piece aforesaid is pressed against it, and thereupon acting to bring the motor aforesaid into operation to actuate said reciprocator in another direction, thereby to impel the contact-piece and hammer aforesaid.

156. In a pianoforte-action and in combination, a hammer; a contact-piece connected therewith; a reciprocator acting as a friction-driver to impel said contact-piece and hammer, said reciprocator being normally at rest; a motor acting to impel said reciprocator; a motor-controlling device, to which said reciprocator is pivoted, said motor-controlling device being actuated by the movement in one direction of said reciprocator when the contact-piece aforesaid is pressed against it, and thereupon acting to bring the motor aforesaid into operation to actuate said reciprocator in another direction; and means controlled by the motor aforesaid and acting to cut off the power from said motor.

157. In a pianoforte-action and in combination, a hammer; a contact-piece connected therewith; a reciprocator acting as a friction-driver to impel said contact-piece and hammer, said reciprocator being normally at rest; a motor acting to impel said reciprocator; a motor-controlling device, to which said reciprocator is pivoted, said motor-controlling device being actuated by the movement in one direction of said reciprocator when the contact-piece aforesaid is pressed against it, and thereupon acting to bring the motor aforesaid into operation to actuate said reciprocator in another direction; and means for cutting off the power from the motor aforesaid, said means including a trip operatively connected with the reciprocator aforesaid.

158. In a pianoforte-action and in combination, a reciprocator normally at rest; a plurality of hammers, normally disconnected from said reciprocator; keys corresponding to said hammers, said keys acting each, when depressed, to connect the hammer corresponding to it with the reciprocator aforesaid; means whereby said reciprocator is impelled when any of the keys aforesaid is depressed, and means acting to disconnect the hammer connected with the reciprocator aforesaid from said reciprocator in advance of the release of the key, governing said hammer.

159. In a pianoforte-action and in combination, a reciprocator normally at rest; a plurality of hammers, normally disconnected from said reciprocator; keys, corresponding to said hammers, each of said keys acting, when depressed, to connect the hammer corresponding to it with the reciprocator aforesaid; means whereby said reciprocator is impelled when any of the keys aforesaid is depressed; and means acting to permit the reciprocator aforesaid to return to its normal position in advance of the release of the key.

160. In a pianoforte-action and in combination, a reciprocator normally at rest; a plurality of hammers normally disconnected from said reciprocator; keys corresponding to said hammers, said keys each acting when depressed, to connect the hammer corresponding to it with the reciprocator aforesaid; motor mechanism, acting when any of the keys aforesaid is depressed, to impel said reciprocator; and means acting to disconnect the hammer connected with the reciprocator aforesaid from said reciprocator in advance of the release of the key corresponding to said hammer.

161. In a pianoforte-action and in combination, a reciprocator normally at rest; a plurality of hammers, normally disconnected from said reciprocator; keys corresponding to said hammers, each of said keys acting when depressed, to connect the hammer corresponding to said key with the reciprocator aforesaid; motor mechanism acting, when any of the keys aforesaid is depressed, to impel said reciprocator; and means acting both to disconnect the hammer for the time being connected with the reciprocator aforesaid from said reciprocator, and to permit said reciprocator to return to its normal position in advance of the release of the key.

162. In a pianoforte-action and in combination, a reciprocator normally at rest; a plurality of hammers, normally disconnected from said reciprocator; keys corresponding to said hammers, each of said keys acting when depressed, to connect the hammer corresponding to said key with the reciprocator aforesaid; motor mechanism acting, when any of the keys aforesaid is depressed, to impel said reciprocator; means acting both to disconnect the hammer, for the time being connected with the reciprocator aforesaid, from said reciprocator, and to permit said reciprocator to return to its normal position in advance of the release of the key; and a check for the hammer.

163. An action for a keyboard instrument, including in combination, a reciprocating friction-driver, normally at rest; a plurality of contact-pieces, normally disconnected from said reciprocating friction-driver, and keys corresponding to said contact-pieces, each key acting, when depressed, to press the contact-piece corresponding to said key against the friction-driver aforesaid.

164. An action for a keyboard instrument, including in combination, a reciprocating friction-driver, normally at rest; a plurality of contact-pieces, normally disconnected from said reciprocating friction-driver; keys, corresponding to said contact-pieces, each of said keys acting, when depressed, to press the contact-piece corresponding to said key against the friction-driver aforesaid, to receive movement therefrom, and a motor, acting to impel said friction-driver when any of the keys aforesaid is depressed.

165. An action for a keyboard instrument, including in combination, a reciprocating friction-driver, normally at rest, said reciprocating friction-driver being mounted to move in two different arcs or paths; motor mechanism, acting to impel said reciprocating friction-driver; a plurality of contact-pieces; keys, corresponding to said contact-pieces, each of said keys acting, when depressed, to press the contact-piece corresponding to said key against the friction - driver aforesaid, to establish a frictional connection therewith, said key also acting to move the reciprocating friction-driver aforesaid in one of the two arcs or paths before mentioned; means operated by the last-mentioned movement of the reciprocating friction - driver aforesaid, acting to bring the motor aforesaid into action to move the friction-driver aforesaid in the other one of the two arcs or paths in which it is mounted to move.

166. An action for a keyboard instrument, including in combination, a reciprocating friction-driver normally at rest; a plurality of contact-pieces; keys, corresponding to said contact-pieces, each of said keys acting, when depressed, to press said contact-piece against said friction-driver to establish a frictional connection therewith; and means acting to disconnect the contact-piece aforesaid from the friction-driver aforesaid, in advance of the release of the key.

167. An action for a keyboard instrument, including in combination, a reciprocating friction-driver, normally at rest; said reciprocating friction - driver being mounted to move in two different arcs or paths; motor mechanism acting to impel said reciprocating friction-driver; a plurality of contact-pieces; keys, corresponding to said contact-pieces, each of said keys acting when depressed, to connect the contact-piece corresponding to it with the friction-driver aforesaid frictionally; said keys each acting also to move the reciprocating friction-driver aforesaid in one of the two arcs or paths before mentioned; means operated by the last-mentioned movement of the reciprocating friction - driver aforesaid acting to bring the motor aforesaid into action to move the friction-driver aforesaid in the other one of the two arcs or paths in which it is mounted to move; and means acting to disconnect the contact-piece aforesaid from the friction-driver aforesaid in advance of the release of the key controlling said contact-piece.

168. An action for a keyboard instrument including in combination, a reciprocating friction-driver, normally at rest; a plurality of contact-pieces to be impelled by said friction-driver; keys, corresponding to said contact-pieces, each of said keys acting when depressed, to press the contact-piece corresponding to said key against the friction-driver; a motor acting to impel said friction - driver when any of the keys aforesaid is depressed; means acting to disconnect the contact-pieces aforesaid, when connected with the reciprocating friction-driver aforesaid by the depressing of the corresponding keys, from said friction-driver, and to permit said friction-driver to return to its normal position in advance of the release of the key; and means whereby each of the contact-pieces aforesaid, when moved by the friction-driver aforesaid and disconnected therefrom, is prevented from returning to its normal position in advance of the release of its key.

169. In a pianoforte-action and in combination, a reciprocating friction-driver normally at rest; a plurality of hammers; contact-pieces, connected with said hammers; and keys, corresponding to said hammers, each of said keys acting, when depressed, to press the contact-piece connected with the hammer corresponding to said key, against the friction-driver aforesaid, to establish a frictional connection between them.

170. In a pianoforte-action and in combination, a motor, normally at rest; a plurality of hammers normally disconnected from said motor; keys corresponding to said hammers, each of said keys acting, when depressed, to connect the hammer corresponding to such key with the motor aforesaid frictionally; and a motor-controlling device controlled by the keys aforesaid, and acting when any key is depressed to bring the motor aforesaid into action to impel the hammer corresponding to the key depressed.

171. In a pianoforte-action and in combination, a reciprocating friction-driver normally at rest; a plurality of hammers; contact-pieces connected respectively with the different hammers aforesaid; keys, corresponding to the hammers aforesaid, each of said keys acting, when depressed, to establish a frictional connection between the contact-piece connected with the hammer corresponding to such key and the friction-driver aforesaid; and motor mechanism, controlled by the keys aforesaid and acting when any of said keys is depressed to impel the friction-driver aforesaid.

172. In a pianoforte-action and in combination, a reciprocator mounted to move in two different arcs or paths, said reciprocator being normally at rest; a motor, for actuating said reciprocator; a plurality of hammers; contact-pieces connected respectively with the different hammers aforesaid; keys, corresponding to said hammers, each key acting when depressed, to press the contact-piece connected with the hammer, corresponding to such key against the reciprocator aforesaid, thereby connecting said contact-piece with said reciprocator frictionally, and moving said reciprocator in one of the two arcs or paths before mentioned; and means operated by the last-mentioned movement of said reciprocator, and acting to bring the motor aforesaid into action, to impel the reciprocator aforesaid in the other one of the arcs or paths in which it is mounted to move, as before mentioned, thereby to impel the contact-piece aforesaid and the hammer connected therewith.

173. In a pianoforte-action and in combination, a plurality of hammers; contact-pieces connected respectively with the different hammers aforesaid; a reciprocator, acting as a friction-driver to impel the contact-pieces aforesaid and the hammers connected therewith, each as required; keys, corresponding to the hammers aforesaid, each of said keys acting when depressed, to connect the contact-piece that is connected with the hammer corresponding to said key with the reciprocator aforesaid frictionally; and an electric motor, acting on the depressing of any of the keys aforesaid to impel the reciprocator aforesaid.

174. In a pianoforte-action and in combination, a plurality of hammers; contact-pieces connected respectively with the different hammers aforesaid; a reciprocator, normally at rest, said reciprocator acting as a friction-driver to impel the contact-pieces and hammers aforesaid, each as required; keys, corresponding to the hammers aforesaid, each of said keys acting when depressed, to press the contact-piece that is connected with the hammer corresponding to said key, against the reciprocator aforesaid, thereby to connect said hammer and contact-piece with said reciprocator frictionally; and means acting to disconnect said contact-piece from said reciprocator, while the pressure upon the key corresponding to said contact-piece is maintained.

175. In a pianoforte-action and in combination, a plurality of hammers; contact-pieces connected respectively with the different hammers aforesaid; a reciprocator, normally at rest, said reciprocator acting as a friction-driver to impel the contact-pieces and hammers aforesaid, each as required; keys, corresponding to said hammers, each of said keys acting when depressed to connect the contact-piece that is connected with the hammer corresponding to such key with the reciprocator aforesaid frictionally; motor mechanism, acting when any of the keys aforesaid is depressed, to impel said reciprocator; and means whereby each of the contact-pieces aforesaid is disconnected from the reciprocator aforesaid, while the pressure upon the key connecting them is maintained.

176. In a pianoforte-action and in combination, a plurality of hammers; contact-pieces, connected respectively with the different hammers aforesaid; a reciprocator normally at rest, said reciprocator acting as a friction-driver to impel the contact-pieces and hammers aforesaid, each as required; keys corresponding to said hammers, each of said keys acting when depressed, to press the contact-piece that is connected with the hammer corresponding to said key against the reciprocator aforesaid; and means acting to disconnect said contact-piece from said reciprocator while the pressure upon the key controlling said contact-piece is maintained; and a check for the hammer.

177. In a pianoforte-action and in combination, a plurality of hammers; contact-pieces connected respectively with the different hammers aforesaid; a reciprocator normally at rest, said reciprocator acting as a friction-driver to impel the contact-pieces and hammers aforesaid, each as required; keys, corresponding to said hammers, each of said keys acting when depressed, to connect the contact-piece that is connected with the hammer corresponding to such key with the reciprocator aforesaid frictionally; motor mechanism, acting, when any of the keys aforesaid is depressed, to impel the reciprocator aforesaid; means whereby each of the contact-pieces connected with the reciprocator aforesaid by the action of the corresponding key, is disconnected from said reciprocator while the pressure upon such key is maintained; and checks for the hammers, whereby they are arrested on rebounding from the string.

In testimony whereof I have hereunto set my hand, at Washington, in the District of Columbia, this 4th day of September, A. D. 1894.

THADDEUS CAHILL.

Attest:
ARTHUR T. CAHILL,
GEO. F. CAHILL.